(12) United States Patent
Oh et al.

(10) Patent No.: US 12,398,231 B2
(45) Date of Patent: Aug. 26, 2025

(54) MODIFIED CONJUGATED DIENE-BASED POLYMER, METHOD FOR PREPARING THE SAME AND RUBBER COMPOSITION INCLUDING THE SAME

(71) Applicant: LG CHEM, LTD., Seoul (KR)

(72) Inventors: Jung Hwan Oh, Daejeon (KR); Ho Young Lee, Daejeon (KR); Jae Sun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 195 days.

(21) Appl. No.: 17/767,992

(22) PCT Filed: Feb. 26, 2021

(86) PCT No.: PCT/KR2021/002463
§ 371 (c)(1),
(2) Date: Apr. 11, 2022

(87) PCT Pub. No.: WO2021/172938
PCT Pub. Date: Sep. 2, 2021

(65) Prior Publication Data
US 2024/0101744 A1 Mar. 28, 2024

(30) Foreign Application Priority Data
Feb. 28, 2020 (KR) .......................... 10-2020-0025512

(51) Int. Cl.
| | | |
|---|---|---|
| *C08K 13/02* | (2006.01) | |
| *C08F 297/04* | (2006.01) | |
| *C08K 3/06* | (2006.01) | |
| *C08K 3/36* | (2006.01) | |
| *C08K 5/544* | (2006.01) | |

(52) U.S. Cl.
CPC ............ *C08F 297/04* (2013.01); *C08K 13/02* (2013.01); *C08F 2810/50* (2013.01); *C08K 3/06* (2013.01); *C08K 3/36* (2013.01); *C08K 5/544* (2013.01); *C08K 2201/014* (2013.01)

(58) Field of Classification Search
CPC .. C08F 297/04; C08F 2/44; C08F 2/06; C08F 236/06; C08F 8/42; C08F 36/04; C08F 2/001; C08F 212/10; C08K 13/02; C08K 3/06; C08K 3/36; C08K 5/544; C08K 2201/014; C08K 3/04; C08K 5/548; C08L 15/00; C08C 19/22
USPC ........................................................ 524/575
See application file for complete search history.

(56) References Cited

U.S. PATENT DOCUMENTS

| | | |
|---|---|---|
| 4,397,994 A | 8/1983 | Takeuchi et al. |
| 5,554,696 A | 9/1996 | Fayt et al. |
| 2009/0275690 A1 | 11/2009 | Weaver et al. |
| 2009/0292043 A1 | 11/2009 | Kurazumi et al. |
| 2010/0028568 A1 | 2/2010 | Weaver et al. |
| 2010/0055358 A1 | 3/2010 | Weaver et al. |
| 2014/0309363 A1 | 10/2014 | Morita et al. |
| 2016/0229992 A1 | 8/2016 | Peters et al. |
| 2016/0355612 A1 | 12/2016 | Chun et al. |
| 2017/0267800 A1 | 9/2017 | Tajima |
| 2018/0208684 A1 | 7/2018 | Choe et al. |
| 2018/0291038 A1 | 10/2018 | Choe et al. |
| 2019/0203021 A1 | 7/2019 | Kyo et al. |
| 2019/0256635 A1 | 8/2019 | Kim et al. |
| 2019/0330447 A1 | 10/2019 | Choe et al. |
| 2020/0002454 A1 | 1/2020 | Lee et al. |
| 2020/0031975 A1 | 1/2020 | Hasebe et al. |
| 2020/0031976 A1 | 1/2020 | Aoshima |
| 2020/0115485 A1 | 4/2020 | Kim et al. |
| 2020/0223968 A1 | 7/2020 | Sohn et al. |
| 2020/0277426 A1 | 9/2020 | Oh et al. |
| 2020/0354482 A1 | 11/2020 | Lee et al. |
| 2021/0079124 A1 | 3/2021 | Lee et al. |

FOREIGN PATENT DOCUMENTS

| | | |
|---|---|---|
| CN | 107810209 A | 3/2018 |
| CN | 109863186 A | 6/2019 |
| CN | 110382566 A | 10/2019 |
| CN | 110461893 A | 11/2019 |
| EP | 3 536 720 A1 | 9/2019 |
| EP | 3 553 095 A1 | 10/2019 |
| JP | 2015-218284 A | 12/2015 |
| JP | 2018-518473 A | 7/2018 |
| JP | 2018-172548 A | 11/2018 |
| KR | 10-2014-0094046 A | 7/2014 |
| KR | 10-2015-0144130 A | 12/2015 |

(Continued)

OTHER PUBLICATIONS

Extended European Search Report issued in corresponding European Patent Application No. 21760007.1, dated Jul. 12, 2023. (KR 10-2019-0128583 and KR 10-2019-0127772 cited therein were cited in an earlier-filed SB08.)

Office Action issued in corresponding Japanese Patent Application No. 2022-523217, dated Jun. 1, 2023. (KR 10-2019-0128583 cited therein was cited in an earlier-filed SB08.).

Office Action issued Nov. 30, 2023 for Chinese Patent Application No. 202180005810.4 (Note: KR 2019-0066560 A & US 2019/0256635 A1. .

(Continued)

*Primary Examiner* — Hannah J Pak
(74) *Attorney, Agent, or Firm* — Morgan, Lewis & Bockius LLP

(57) ABSTRACT

The present invention relates to a modified conjugated diene-based polymer having excellent rolling resistance and improved processability, a method for preparing the same and a rubber composition including the same, and provides a modified conjugated diene-based polymer which includes a repeating unit derived from a conjugated diene-based monomer, and a functional group derived from a modifier, and satisfies conditions (i) to (vii), a method for preparing the same and a rubber composition including the same.

8 Claims, No Drawings

(56) References Cited

FOREIGN PATENT DOCUMENTS

| | | |
|---|---|---|
| KR | 10-2017-0056569 A | 5/2017 |
| KR | 10-1857392 B1 | 6/2018 |
| KR | 10-2018-0080687 A | 7/2018 |
| KR | 10-2019-0030216 A | 3/2019 |
| KR | 10-2019-0066559 A | 6/2019 |
| KR | 10-2019-0066560 A | 6/2019 |
| KR | 10-2019-0066564 A | 6/2019 |
| KR | 10-2019-0066573 A | 6/2019 |
| KR | 10-2019-0095481 A | 8/2019 |
| KR | 10-2019-0127772 A | 11/2019 |
| KR | 10-2019-0128583 A | 11/2019 |
| RU | 2425845 C2 | 8/2011 |
| RU | 2641751 C2 | 1/2018 |
| TW | 200835736 A | 9/2008 |
| WO | 2017/047924 A1 | 3/2017 |
| WO | 2018/128291 A1 | 7/2018 |
| WO | 2019/216636 A1 | 11/2019 |

OTHER PUBLICATIONS

International Search Report (with partial English translation) and Written Opinion dated Jun. 15, 2021 issued in corresponding International Patent Application No. PCT/KR2021/002463.

Office Action issued Feb. 6, 2024 for Russian Patent Application No. 2022111872 (Note: KR 10-2019-0128583 A, WO 2017/047924 A1 & KR 10-2019-0127772 A were cited in a prior IDS.).

Office Action issued Feb. 27, 2024 for Taiwanese Patent Application No. 11320203220 (Note: CN 110382566 A, US 2020/0031976 A1 & JP 2018-518473 A were cited in a prior IDS.).

Zezin A.B., "High molecular compounds", Textbook and workshop for academic bachelor's degree, 2016, 7 pages total (See Partial Translation).

MODIFIED CONJUGATED DIENE-BASED POLYMER, METHOD FOR PREPARING THE SAME AND RUBBER COMPOSITION INCLUDING THE SAME

CROSS-REFERENCE TO RELATED APPLICATIONS

The present application claims the benefit of priority based on Korean Patent Application No. 10-2020-0025512, filed on Feb. 28, 2020, the entire contents of which are incorporated herein by reference.

TECHNICAL FIELD

The present invention relates to a modified conjugated diene-based polymer which has excellent rolling resistance and improved processability, a method for preparing the same and a rubber composition including the same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

The solution-polymerized SBR is prepared using an anionic polymerization initiator, and a method introducing a functional group into a terminal by coupling or modifying the chain terminal of the polymer thus formed using various modifiers is being used. For example, U.S. Pat. No. 4,397,994 discloses a method of the coupling active anion of the chain terminal of a polymer obtained by polymerizing styrene-butadiene using alkyllithium which is a monofunctional initiator, in a non-polar solvent using a coupling agent such as a tin compound.

In addition, it is generally advantageous that the solution-polymerized SBR has broad molecular weight distribution in respect of improving compounding processability, and a method of preparing by high-temperature polymerization or introducing a long chain branch using a coupling agent has been tried, but in case of the high-temperature polymerization, molecular weight distribution became broad, but a modification ratio is reduced, and in case of using the coupling agent, there are problems in reducing rolling resistance due to steric hindrance between the coupling agent and a filler.

Accordingly, the development of a modified conjugated diene-based polymer having excellent rolling resistance and improved processability by having broad molecular weight distribution and a high modification ratio is required.

PRIOR ART DOCUMENT (Patent Document 1) U.S. Pat. No. 4,397,994

DISCLOSURE OF THE INVENTION

Technical Problem

The present invention has been devised to solve the above-mentioned problems of the conventional technique, and an object is to provide a modified conjugated diene-based polymer including: a repeating unit derived from a conjugated diene-based monomer; and a functional group derived from a modifier, satisfying conditions (i) to (vii), and having excellent affinity with a filler and processability.

In addition, another object of the present invention is to provide a method for preparing a modified conjugated diene-based polymer by which the modified conjugated diene-based polymer satisfying conditions (i) to (vii) at the same time may be easily prepared by using an oligomer having an anionic active terminal as a polymerization initiator and performing polymerization reaction by injecting the polymerization initiator in at least two installments according to a polymerization conversion ratio during preparing an active polymer.

Also, another object of the present invention is to provide a rubber composition including the modified conjugated diene-based polymer.

Technical Solution

To solve the above-described tasks, according to an embodiment of the present invention, the present invention provides a modified conjugated diene-based polymer including: a repeating unit derived from a conjugated diene-based monomer; and a functional group derived from a modifier, and satisfying the following conditions of (i) to (vii):

(i) a molecular weight distribution curve by gel permeation chromatography is unimodal;

(ii) molecular weight distribution is 2.0 or more;

(iii) a weight average molecular weight is 100,000 g/mol to 2,000,000 g/mol;

(vi) a modification ratio is 70% or more;

(v) a mooney stress relaxation ratio measured at 100° C. is 0.7 or more;

(vi) a mooney large relaxation area (MLRA) measured at 100° C. and represented by the following Mathematical Formula 1 is 1500 MU-s or less; and (vii) nitrogen atom content is 100 ppm or more based on a weight of the polymer:

$$A = \frac{k}{(a+1)}[t_f^{(a+1)} - t_o^{(a+1)}]$$ [Mathematical Formula 1]

in Mathematical Formula 1,
A is a mooney large relaxation area (MLRA),
k is a mooney intercept after 1 second from stopping operation of a rotor of a mooney viscometer,
a is a mooney relaxation ratio,
$t_o$ is an initiation point of mooney relaxation, and
$t_f$ is a finishing point of mooney relaxation.

In addition, the present invention provides a method for preparing a modified conjugated diene-based polymer, including: polymerizing a conjugated diene-based monomer, or a conjugated diene-based monomer and an aromatic vinyl-based monomer in a hydrocarbon solvent to prepare an active polymer (S1); and reacting or coupling the active polymer prepared in step (S1) with a modifier (S2), wherein the polymerization of step (S1) is performed by initiating the polymerization in the presence of a first polymerization initiator, and performing polymerization reaction by injecting a second polymerization initiator in at least one installment at a point where a polymerization conversion ratio is 50% to 95%, the first and second polymerization initiators are oligomers having an anionic active terminal, prepared by reacting an organometallic compound, a conjugated diene-based monomer and a compound represented by the following Formula 1, and step (S1) is continuously performed in at least two polymerization reactors, where a polymerization conversion ratio in the first reactor among the polymerization reactors is 10% to 50%:

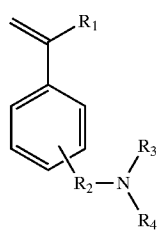

[Formula 1]

in Formula 1,
$R_1$ is a hydrogen atom, or an alkyl group of 1 to 20 carbon atoms, $R_2$ is a single bond or a substituted with a substituent or unsubstituted alkylene group of 1 to 20 carbon atoms, $R_3$ and $R_4$ are each independently a substituted with a substituent or unsubstituted alkyl group of 1 to 20 carbon atoms, a cycloalkyl group of 3 to 20 carbon atoms or an aryl group of 6 to 30 carbon atoms, and the substituent is one or more selected from the group consisting of an alkyl group of 1 to 20 carbon atoms, a cycloalkyl group of 3 to 20 carbon atoms and an aryl group of 6 to 20 carbon atoms.

In addition, the present invention provides a rubber composition including the modified conjugated diene-based polymer and a filler.

Advantageous Effects

The modified conjugated diene-based polymer according to the present invention is prepared by a preparation method suggested in the present invention, and may have broad molecular weight distribution, a high modification ratio, a low branching structure of a 2-arm structure, and excellent processability as well as excellent affinity with a filler.

In the method for preparing a modified conjugated diene-based polymer according to the present invention, polymerization reaction is performed by injecting a polymerization initiator in at least two installments according to a polymerization conversion ratio during the polymerization in step (S1) for preparing an active polymer using an oligomer having an anionic active terminal as a polymerization initiator, and accordingly, an active polymer having broad molecular weight distribution may be easily prepared even not under high-temperature conditions, and a conjugated diene-based polymer having a high modification ratio may be easily prepared.

Also, the rubber composition according to the present invention includes the modified conjugated diene-based polymer and may have excellent running resistance and processability in balance.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Definition of Terms

The term "mooney large relaxation area (MLRA)" in the present disclosure is a measured value (measure) of chain relaxation in a molten polymer, and indicates that longer or more branched polymer chain may store more energy and require longer time for relaxation after removing applied deformation. For example, the mooney large relaxation area of a ultrahigh molecular weight or long chain branched polymer may be greater than a polymer having a broader or narrower molecular weight when compared with a polymer having the same mooney viscosity.

The term "polymer" in the present disclosure refers to a homopolymer compound or a copolymer compound prepared by polymerizing one type of a monomer or two or more different types of monomers.

The term "1,2-vinyl bond content" in the present disclosure refers to the mass (or weight) percent of butadiene included in 1,2-positions in a polymer chain of a copolymer, based on a conjugated diene-based monomer (butadiene, etc.) derived moiety (the total weight of polymerized butadiene) in the copolymer.

The term "styrene bond content" in the present disclosure refers to the mass (or weight) percent of styrene included in a chain of a copolymer derived from an aromatic vinyl-based monomer (styrene, etc.) in the copolymer.

The term "modification ratio (%)" in the present disclosure may mean the ratio of a modified copolymer chain with respect to an unmodified copolymer chain in case of modifying a copolymer where a polymerization active part is present with a modifier, and the ratio is represented by percent (%) based on the total copolymer including the modified copolymer chain and the unmodified copolymer chain.

The term "substituted" in the present invention may mean the hydrogen of a functional group, an atomic group or a compound is substituted with a specific substituent. If the hydrogen of a functional group, an atomic group or a compound is substituted with the specific substituent, one or a plurality of including two or more substituents may be present according to the number of hydrogen present in the functional group, the atomic group or the compound, and if a plurality of substituents are present, each substituent may be the same or different.

The term "alkyl group" in the present disclosure may mean monovalent aliphatic saturated hydrocarbon, and may include a linear alkyl group such as methyl, ethyl, propyl and butyl; a branched alkyl group such as isopropyl, sec-butyl, tert-butyl and neo-pentyl; and a cyclic saturated hydrocarbon, or a cyclic unsaturated hydrocarbon group including one or two or more unsaturated bonds.

The term "alkylene group" in the present disclosure may mean divalent aliphatic saturated hydrocarbon such as methylene, ethylene, propylene and butylene.

The term "cycloalkyl group" in the present disclosure may mean cyclic saturated hydrocarbon.

The term "aryl group" in the present disclosure may mean cyclic aromatic hydrocarbon, and may include both monocyclic aromatic hydrocarbon in which one ring is formed, and polycyclic aromatic hydrocarbon in which two or more rings are bonded.

The term "aralkyl group" in the present disclosure is also referred to as an aralkyl and may mean a combination group of an alkyl group which is formed by substituting a hydrogen atom bonded to carbon constituting the alkyl group with an aryl group, and an aryl group.

The term "single bond" in the present disclosure may mean a single covalent bond itself, excluding a separate atomic or molecular group.

The term "derived unit", "derived repeating unit" and "derived functional group" in the present disclosure may represent a component or a structure comes from a certain material, or the material itself.

The terms "comprising", and "having" and the derivatives thereof in the present invention, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

Measurement Methods and Conditions

In the present disclosure, the "1,2-vinyl bond content" is obtained by measuring and analyzing the vinyl content and the styrene content in a copolymer and first and second copolymer units using Varian VNMRS 500 MHz NMR. 1,1,2,2-tetrachloroethane was used as a solvent during measuring NMR, and a specimen was prepared by dissolving a polymer into 0.02 M in the solvent. The 1,2-vinyl bond content and the styrene bond content in a total polymer were measured by calculating 6.0 ppm as a solvent peak, 7.2-6.9 ppm as random styrene peaks, 6.9-6.2 ppm as block styrene peaks, 5.8-5.1 ppm as 1,4-vinyl and 1,2-vynyl peaks, and 5.1-4.5 ppm as 1,2-vinyl peaks.

In the present disclosure, "weight average molecular weight (Mw)", "molecular weight distribution (MWD)", and "unimodal properties" are obtained by measuring molecular weights through gel permeation chromatography (GPC) analysis and obtaining a molecular weight distribution curve. In addition, the molecular weight distribution (PDI, MWD, Mw/Mn) is calculated from each molecular weight measured. Particularly, by gel permeation chromatography (GPC) (PL GPC220, Agilent Technologies) under the conditions below, a weight average molecular weight (Mw) and a number average molecular weight (Mn) were measured, a molecular weight distribution curve was obtained, and molecular weight distribution (PDI, MWD, Mw/Mn) was obtained by calculating from the molecular weights thus measured.

Column: two columns of PLgel Olexis (Polymer Laboratories Co.) and one column of PLgel mixed-C (Polymer Laboratories Co.) were used in combination Solvent: a mixture of tetrahydrofuran and 2 wt % of an amine compound was used.

Flow rate: 1 ml/min

Specimen concentration: 1-2 mg/ml (diluted in THF)

Injection amount: 100 μl

Column temperature: 40° C.

Detector: Refractive index

Standard: Polystyrene (calibration with cubic function)

In the present disclosure, the "modification ratio (%)" is a value calculated according to Mathematical Formula 2 below using a chromatogram obtained from the measurement of chromatography. The measurement of the chromatography was conducted as follows using, for example, gel permeation chromatograph (GPC) (PL GPC220, Agilent Technologies). A copolymer was dissolved in cyclohexane and stored in a mobile phase reservoir of a specimen (prepare in 1.0 m/ml), and tetrahydrofuran (THF) was stored in another mobile phase reservoir. The mobile phase reservoirs were connected with a dual-head pump, respectively, and first, the solution in the mobile phase reservoir in which the polymer was dissolved was injected into a column filled with a silica absorbent through the pump and an injector with a loop volume of 100 μl. In this case, the pressure of the pump was 450 psi, and an injection flow rate was 0.7 ml/min. Then, after confirming that an unmodified copolymer unit in the copolymer was not detected from a detector (ELSD, Waters Co.) any more, based on 5 minutes from the initiation of the injection, the tetrahydrofuran was injected into the column through the pump. In this case, the pressure of the pump was 380 psi, and an injection flow rate was 0.7 ml/min. After confirming that a modified copolymer unit in the polymer according to the injection of tetrahydrofuran from the detector was not detected any more, the injection of a second solvent was finished. Then, from the detected chromatogram results, a modification ratio (%) was calculated according to Mathematical Formula 2 below.

[Mathematical Formula 2]

$$\text{modification ratio (\%)} = \frac{\text{peak area of modified copolymer unit}}{\text{peak area of unmodified copolymer unit} + \text{peak area of modified copolymer unit}} \times 100$$

In Mathematical Formula 2, the peak area of the unmodified copolymer unit is the peak area of the chromatogram on a first solution transported to the detector, and the peak area of the modified copolymer unit is the peak area of the chromatogram on a second solution transported to the detector.

In the present disclosure, the "N atom content" may be measured through an NSX analysis method. The measurement by the NSX analysis method may use a quantitative analyzer of a trace amount of nitrogen (NSX-2100H). Particularly, the quantitative analyzer of a trace amount of nitrogen (Auto sampler, Horizontal furnace, PMT & Nitrogen detector) was turned on, carrier gas flow amounts were set to 250 ml/min for Ar, 350 ml/min for $O_2$, and 300 ml/min for ozonizer, a heater was set to 800° C., and the analyzer was stood for about 3 hours for stabilization. After stabilizing the analyzer, a calibration curve of calibration curve ranges of 5 ppm, 10 ppm, 50 ppm, 100 ppm and 500 ppm was made using Nitrogen standard (AccuStandard S-22750-01-5 ml), and an area corresponding to each concentration was obtained. Then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the nitrogen atom content was calculated.

In this case, the specimen used for the NSX analysis method is a modified conjugated diene-based polymer specimen from which solvents are removed by putting the specimen in hot water heated by steam and stirring, and may be a specimen from which remaining monomers, remaining modifiers and oil are removed. In addition, if an oil is added to the specimen, the specimen may be one after extracting (removing) the oil.

In the present disclosure, the "mooney stress relaxation ratio (−S/R)" was measured using MV2000E of Alpha Technologies Co. using Large Rotor at 100° C. and at a rotor speed of 2±0.02 rpm. Particularly, a polymer is stood at room temperature (23±5° C.) for 30 minutes or more, and 27±3 g is collected and put in a die cavity, and then, Platen is operated for 4 minutes while applying torque for measuring and obtaining mooney viscosity. After that, the slope value of the change of the mooney viscosity shown while releasing torque is measured, and the absolute value thereof is shown.

In the present disclosure, the "mooney large relaxation area (MLRA)" is a value obtained by plotting a mooney torque graph in accordance with time and computing from Mathematical Formula 1, and may be obtained by measuring the slope value of mooney viscosity change shown while releasing torque by stopping a rotor after measuring a mooney viscosity, obtaining a mooney relaxation ratio (a) which is the absolute value thereof, and obtaining from the integration value of a mooney relaxation curve during from 1 second ($t_o$) to 120 seconds ($t_f$) after stopping the rotor, and this integration value may be computed from Mathematical Formula 1.

Modified Conjugated Diene-Based Polymer

The modified conjugated diene-based polymer according to the present invention may be prepared by a preparation method which will be described later and may have broad molecular weight distribution and highly modified terminals.

Particularly, the modified conjugated diene-based polymer according to the present invention is characterized in including a repeating unit derived from a conjugated diene-based monomer, and a functional group derived from a modifier, and satisfying the following conditions (i) to (vii):
(i) a molecular weight distribution curve by gel permeation chromatography is unimodal;
(ii) molecular weight distribution is 2.0 or more;
(iii) a weight average molecular weight is 100,000 g/mol to 2,000,000 g/mol;
(vi) a modification ratio is 70% or more;
(v) a mooney stress relaxation ratio measured at 100° C. is 0.7 or more;
(vi) a mooney large relaxation area (MLRA) measured at 100° C. and represented by the following Mathematical Formula 1 is 1500 MU-s or less; and
(vii) nitrogen atom content is 100 ppm or more based on a weight of the polymer:

$$A = \frac{k}{(a+1)}\left[t_f^{(a+1)} - t_o^{(a+1)}\right] \quad \text{[Mathematical Formula 1]}$$

in Mathematical Formula 1,
A is a mooney large relaxation area (MLRA),
k is a mooney intercept after 1 second from stopping operation of a rotor of a mooney viscometer,
a is a mooney relaxation ratio,
$t_o$ is an initiation point of mooney relaxation, and
$t_f$ is a finishing point of mooney relaxation.

According to an embodiment of the present invention, the modified conjugated diene-based polymer is prepared through a preparation method in which step (S1) for performing while controlling the polymerization conversion ratio in a first reactor to 10% to 50% by applying an oligomer having an anionic active terminal as a polymerization initiator during the polymerization of step (S1) which will be explained later, is included, and polymerization reaction is performed by injecting the polymerization initiator in at least two installments, and by preparing through such a preparation method, the conditions (i) to (vii) above may be satisfied at the same time.

In addition, the oligomer is prepared through the reaction of an organometallic compound, a conjugated diene-based monomer and a compound represented by Formula 1 and may include the repeating unit derived from the compound represented by Formula 1 in a molecule. Accordingly, by introducing the derived unit from the compound represented by Formula 1 in the polymer separately from a modifier, the condition (vii) above may be satisfied more favorably.

From such results, the modified conjugated diene-based polymer satisfies conditions (i) to (vii) at the same time and may have excellent mechanical properties such as tensile properties, viscoelasticity and compounding processability at the same time, and accordingly, may have excellent tensile properties, wet skid resistance, rolling resistance and processability in balance.

Main Parameters of Modified Conjugated Diene-Based Polymer

The modified conjugated diene-based polymer according to an embodiment of the present invention has a unimodal molecular weight distribution curve by gel permeation chromatography (GPC) and may have molecular weight distribution of 2.0 or more, and here, the unimodal curve shape and the molecular weight distribution may be satisfied at the same time by a preparation method described below. Particularly, the modified conjugated diene-based polymer may have a unimodal molecular weight distribution curve and have molecular weight distribution of 2.0 to 5.0, or 2.0 to 3.0.

In addition, the modified conjugated diene-based polymer may have a weight average molecular weight (Mw) measured by gel permeation chromatography (GPC) of 100,000 g/mol to 2,000,000 g/mol, 150,000 g/mol to 1,800,000 g/mol, or 200,000 g/mol to 1,600,000 g/mol, and within this range, rolling resistance and wet skid resistance may be excellent in a balanced way.

In addition, the modified conjugated diene-based polymer may include a functional group derived from a modifier and may have a modification ratio of 70% or more, or 90% or more. Here, the functional group derived from the modifier may mean a functional group derived from a modifier, which is present at one terminal of an active polymer through the reaction or coupling between an active polymer and a modifier.

In addition, the modification ratio may be influenced by the degree of modification or coupling by a modifier in modification reaction, and may be controlled according to the amount of a modifier and amount of a polar additive injected during preparation, the reaction time, the mixing time of a modifier and an active polymer, a mixing degree, etc.

In addition, the modification ratio may be influenced by the polymerization initiator used, reaction injection point thereof and the amount used thereof during preparing the modified conjugated diene-based polymer.

Meanwhile, the modified conjugated diene-based polymer may be prepared by a preparation method described later, which is performed continuously in at least two polymerization reactors, controlling a polymerization conversion ratio in a first reactor to 10% to 50%, and including a polymerization step for preparing an active polymer by injecting a polymerization initiator in at least two installments and a modification step of reacting or coupling the active polymer with a modifier. Through such a preparation method, a molecular weight distribution curve may be unimodal, molecular weight distribution may be broad and 2.0 or more, and a modification ratio of the above-described numerical may be satisfied.

Particularly, in a continuous polymerization method, the injection of a raw material and the discharge of a product after finishing the reaction are continuously performed, and it could be considered that polymer chains having diverse molecular weights with different reaction degrees are mixed in the product discharged, including a polymer chain injected and reacted from the initiation point of the reaction, a polymer chain formed by injecting and reacting from the middle of the reaction and a polymer chain formed by injecting and reacting at the end point of the polymerization. However, a raw material injected into a reactor at the same point may undergo polymerization in similar reaction rates to be discharged as a product, and accordingly, polymer chains in the product may have similar degree of molecular weights and have a unimodal shape with narrow molecular weight distribution than expected. Then, in case of performing modification reaction by injecting a modifier, a polymer chain modified and/or coupled by a modifier, or a polymer chain unmodified and/or uncoupled may be produced, and two or more groups having a great difference of molecular weights may be formed, and a multi-modal molecular weight distribution curve having two or more peaks of a molecular weight distribution curve may be formed. However, according to the preparation method of the present invention, an active polymer is prepared by a polymerization step in which a polymerization conversion ratio in a first reactor is controlled to 10% to 50%, and a polymerization initiator is injected in at least two installments, and a raw material (monomer) reacted and exhausted at the initiation point of the polymerization may be controlled, and may be controlled to form a new polymer chain with the polymerization initiator injected in installments, and accordingly, a polymer product including polymer chains having diverse molecular weights may be obtained.

Accordingly, the polymer chains reacted and/or coupled by the reaction with a modifier later may also have diverse molecular weights, and a specific peak is not dominantly shown, a broad unimodal molecular weight distribution curve may be shown as a single peak, and at the same time, molecular weight distribution may be broad.

Also, through the injection of the polymerization initiator in installments, the number of polymer chains having diverse sizes of molecular weights having an active part with a modifier may be absolutely greater than the number of polymer chains in an active polymer prepared from common continuous type polymerization, and accordingly, may show a higher modification ratio when compared to a modified conjugated diene-based polymer prepared by common continuous type polymerization with the application of the same modifier.

In another embodiment, the modified conjugated diene-based polymer may have a mooney stress relaxation ratio measured at 100° C. of 0.7 to 3.0, 0.8 to 2.0, more particularly, 0.9 to 1.5.

Here, the mooney stress relaxation ratio may be used as an index of the branch structure (or linearity) of a corresponding polymer, for example, if compared to a polymer with an equivalent mooney viscosity, the mooney stress relaxation ratio is reduced with the increase of branching and may be used as an index of the degree of branching. The modified conjugated diene-based polymer according to the present invention satisfies the conditions (i) to (iv), (vi) and (vii) and at the same time has a mooney stress relaxation ratio in the above-described range, and thus, may have excellent processability and at the same time, may have excellent tensile properties and viscoelasticity properties.

In addition, the modified conjugated diene-based polymer according to an embodiment of the present invention is required to satisfy the mooney viscosity measured under conditions of ASTM D1646 of 50 to 100, particularly, 70 to 100, preferably, 70 to 90. There are various measurements for evaluating processability, but if the mooney viscosity satisfies the above-described range, the processability may be quite excellent.

In another embodiment, the modified conjugated diene-based polymer may have a mooney large relaxation area (MLRA) measured at 100° C. represented by Mathematical Formula 1 below of 1500 MU-s or less.

$$A = \frac{k}{(a+1)}\left[t_f^{(a+1)} - t_o^{(a+1)}\right] \quad \text{[Mathematical Formula 1]}$$

In Mathematical Formula 1,
A is a mooney large relaxation area (MLRA),
k is a mooney intercept after 1 second from stopping operation of a rotor of a mooney viscometer,
a is a mooney relaxation ratio,
$t_o$ is an initiation point of mooney relaxation, and
$t_f$ is a finishing point of mooney relaxation.

Here, the initiation point of mooney relaxation may represent a point after 1 second from the stopping of rotor operation, and may mean a point when mooney torque has a k value. In addition, the finishing point of mooney relaxation may represent a point where the measurement of mooney relaxation is finished in the measurement test of mooney relaxation. That is, $t_f-t_o$ may represent a mooney relaxation time.

Also, according to an embodiment of the present invention, $t_o$ may be 1 second, and $t_f$ may be 80 seconds to 150 seconds. In other words, the mooney large relaxation area according to an embodiment of the present invention may be an integrated area under a mooney torque-relaxation time curve from 1 second, to 80 seconds to 150 seconds. In addition, the $t_f$ may particularly be 90 seconds to 130 seconds, or 100 seconds to 120 seconds.

In the modified conjugated diene-based polymer of the present invention, the mooney large relaxation area of 1500 MU-s or less is one technical means for serving excellent tensile properties and viscoelasticity properties together with excellent processability. If the mooney large relaxation area is in the above range, the target effects of the present invention may be shown. In addition, if the mooney large relaxation area has a very small value, mechanical properties such as tensile properties may be deteriorated, and in view of showing excellent processability together with excellent tensile properties and viscoelasticity properties in balance, the mooney large relaxation area of the modified conjugated diene-based polymer according to an embodiment of the present invention may be 300 MU-s or more.

Meanwhile, generally, the molecular weight and the physical properties of mooney viscosity of a polymer are properties in proportional relationship and show equal tendency, and a polymer with a high molecular weight has defects of a high mooney viscosity and inferior processability, and a polymer with a low molecular weight has a low mooney viscosity and relatively good processability but has defects of inferior mechanical properties such as tensile properties. However, the modified conjugated diene-based polymer according to an embodiment of the present invention has a mooney large relaxation area of 1500 MU-s or less and achieves excellent processability and tensile properties in balance.

In addition, the mooney large relaxation area tends to increase with the increase of branches when compared to a polymer having the same mooney viscosity and is used as the index of the degree of branching (or linearity), but may be influenced by the molecular weight of a corresponding polymer as well as the degree of branching of the polymer, and accordingly, the mooney large relaxation area may be different though having the same degree of branching (or linearity).

Meanwhile, the modified conjugated diene-based polymer according to the present invention may be prepared by the preparation method which will be explained later, and the molecular weight, modification ratio and degree of branching may be controlled at the same time. Accordingly, a molecular weight distribution curve may be unimodal, molecular weight distribution may be broad, and a mooney stress relaxation ratio and a mooney large relaxation area may be controlled at the same time, thereby satisfying conditions (i) to (vii) at the same time.

The mooney large relaxation area may be a value obtained by plotting a mooney torque graph in accordance with time and then computing from Mathematical Formula 1, and in this case, the mooney viscosity (MV, ML1+4, @100° C. MU) may be measured by using MV-2000 (ALPHA Technologies Co.) using Large Rotor at a rotor speed of 2±0.02 rpm at 100° C. In this case, a specimen used was stood at room temperature (23±5° C.) for 30 minutes or more, and 27±3 g of was collected and put in a die cavity, and then, measurement was conducted for 4 minutes while operating Platen.

In addition, after measuring a mooney viscosity, by measuring the slope value of mooney viscosity change shown while the torque is released by stopping the rotor, its absolute value may be obtained as a mooney relaxation ratio (a). In addition, the mooney large relaxation area may be obtained from the integration value of the mooney relaxation curve during from 1 second ($t_o$) to 120 seconds ($t_f$) after stopping the rotor, and this integration value may be computed from Mathematical Formula 1. If the mooney relaxation area satisfies the above-described range, the improving effects of viscoelasticity properties, particularly, rolling resistance (RR) during compounding a rubber composition may be achieved. Particularly, if the mooney large relaxation area satisfies the above-described range under the mooney viscosity conditions of 80 or more, preferably, 90 or more, even better improving effects of rolling resistance may be obtained.

In another embodiment, the modified conjugated diene-based polymer may have the nitrogen atom content of 100 ppm or more, 100 ppm to 1,000 ppm, or 200 ppm to 500 ppm based on the weight of the polymer, and within this range, a rubber composition including the modified conjugated diene-based polymer may have excellent effects of mechanical properties such as tensile properties and viscoelasticity properties. Meanwhile, the nitrogen atom may be derived from an oligomer which will be explained later, or from the oligomer and a modifier, and may be prepared by a preparation method which will be explained later to have relatively nitrogen atom content.

Particularly, the modified conjugated diene-based polymer according to the present invention is prepared by a preparation method which will be explained later, controls a raw material (monomer) exhausted by the reaction at the early stage of polymerization, and has a nitrogen atom derived from a polymerization initiator through forming new polymer chains with a polymerization initiator which is injected in installments. Accordingly, there may be a large amount of active polymer chains having a reactive active part with a modifier, and thus, the nitrogen atom content in a polymer may be higher than a common single terminal and/or both terminals. In the preparation of a modified conjugated diene-based polymer though a common continuous or batch type polymerization method, a monomer is polymerized in the presence of a polymerization initiator to prepare an active polymer, and then, through the reaction or coupling with a modifier, a modified conjugated diene-based polymer is prepared. In this case, the active polymer is produced through the initiation of polymerization by the reaction of the polymerization initiator and the monomer and keeping the reaction of terminal anions with the monomer to propagate a polymer chain. At last, the number of polymer chains produced in case of the common continuous or batch type polymerization method by which a polymerization initiator is injected at one point prior to initiating polymerization and polymerization is performed, may be bound to be limited when compared with that by the preparation method according to the present invention, by which a polymerization initiator is injected in installments at specific points, and new chains are consistently produced.

In addition, though a polymerization initiator is injected in installments in a common continuous or batch type polymerization method, if a monomer capable of reacting with the polymerization initiator injected in installments is not present or present in a very small amount, newly formed polymer chains may be none or highly limited, and as a result, the number of polymer chains in the active polymer may not be virtually increased. However, in the preparation method according to the present invention, the polymerization initiator is injected in installments at specific points and at the same time, a polymerization conversion ratio in a first polymerization reactor is controlled to 10% to 50%, that is, the initial polymerization degree of a polymer is controlled to a specific range. Also, by controlling the amount of the monomer to sufficiently produce new polymer chains through the reaction with the polymerization initiator injected in installments, the number of polymer chains in an active polymer thus prepared may be markedly increased. Here, the polymer chain in the active polymer reacts or is coupled with a modifier later, and the increase of the number of the polymer chains means the increase of polymer chains modified by reacting or coupling with a modifier.

Through the preparation by the preparation method, the modified conjugated diene-based polymer according to an embodiment of the present invention may include a great large amount of polymer chains which include nitrogen atoms derived from an oligomer included in a polymerization initiator, and may have absolutely increased nitrogen atom content when compared with a polymer prepared by another polymerization method using the same polymerization initiator and/or a modifier.

Configuration of Modified Conjugated Diene-Based Polymer

According to an embodiment of the present invention, the modified conjugated diene-based polymer may include a polymer chain including a repeating unit derived from a conjugated diene-based monomer and a functional group derived from a modifier included in at least one terminal of the polymer chain. Here, the repeating unit derived from the modified conjugated diene-based monomer may mean a repeating unit formed during polymerizing the conjugated diene-based monomer, and the functional group derived from the modifier may mean a functional group derived from the modifier present at one terminal of the active polymer through the reaction or coupling between the active polymer prepared by the polymerization of the conjugated diene-based monomer with the modifier.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

In another embodiment, the modified conjugated diene-based polymer may further include a repeating unit derived from a compound represented by Formula 1 below, and in this case, the modified conjugated diene-based polymer may include a repeating unit derived from a conjugated diene-based monomer, a repeating unit derived from the compound represented by Formula 1 and a functional group derived from a modifier. In addition, the repeating unit derived from the compound represented by Formula 1 may be included in a polymer chain including the repeating unit derived from the conjugated diene-based monomer and in at least one terminal of the polymer chain.

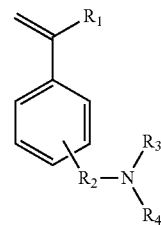

[Formula 1]

In Formula 1, $R_1$ is a hydrogen atom, or an alkyl group of 1 to 20 carbon atoms, $R_2$ is a single bond or a substituted with a substituent or unsubstituted alkylene group of 1 to 20 carbon atoms, $R_3$ and $R_4$ are each independently a substituted with a substituent or unsubstituted alkyl group of 1 to 20 carbon atoms, a cycloalkyl group of 3 to 20 carbon atoms or an aryl group of 6 to 30 carbon atoms, and the substituent is one or more selected from the group consisting of an alkyl group of 1 to 20 carbon atoms, a cycloalkyl group of 3 to 20 carbon atoms and an aryl group of 6 to 20 carbon atoms.

Here, the repeating unit derived from the compound represented by Formula 1 may be derived from an oligomer which is the polymerization initiator used in a preparation method which will be explained later.

Particularly, in Formula 1, $R_1$ may be a hydrogen atom or an alkyl group of 1 to 10 carbon atoms, $R_2$ may be a single bond or an unsubstituted alkylene group of 1 to 10 carbon atoms, and $R_3$ and $R_4$ may be each independently an unsubstituted alkyl group of 1 to 10 carbon atoms, a cycloalkyl group of 3 to 10 carbon atoms or an aryl group of 6 to 12 carbon atoms.

In another embodiment, the modified conjugated diene-based polymer may further include a repeating unit derived from an aromatic vinyl-based monomer, and in this case, the modified conjugated diene-based polymer may include a repeating unit derived from a conjugated diene-based monomer, a repeating unit derived from an aromatic vinyl-based monomer, a repeating unit derived from a compound represented by Formula 1 and a functional group derived from a modifier.

According to an embodiment of the present invention, the aromatic vinyl-based monomer may include one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, 3-(2-pyrrolidino ethyl)styrene, 4-(2-pyrrolidino ethyl)styrene and 3-(2-pyrrolidino-1-methyl ethyl)-α-methylstyrene.

In another embodiment, the modified conjugated diene-based polymer may be a copolymer which further includes a repeating unit derived from a diene-based monomer of 1 to 10 carbon atoms together with the repeating unit derived from the conjugated diene-based monomer. The repeating unit derived from the diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

In addition, the modified conjugated diene-based polymer may have the vinyl content of 5 wt % or more, 10 wt % or more, or 10 wt % to 60 wt %. Here, the vinyl content may mean the content of not 1,4-added but 1,2-added conjugated diene-based monomer based on 100 wt % of a conjugated diene-based copolymer formed using a monomer having a vinyl group and an aromatic vinyl-based monomer.

Modifier

In addition, the modifier may be a modifier for modifying the terminal of a polymer, particularly, a modifier having affinity with silica. The modifier having affinity with silica may mean a modifier containing a functional group having affinity with silica in a compound used as the modifier, and the functional group having affinity with silica may mean a functional group having excellent affinity with a filler, particularly, a silica-based filler, and capable of making interaction between the silica-based filler and the functional group derived from the modifier.

The modifier may be, for example, an alkoxysilane-based compound, particularly, an alkoxysilane-based compound containing one or more heteroatoms such as a nitrogen atom, an oxygen atom and a sulfur atom. In case of using the alkoxysilane-based compound as the modifier, through substitution reaction between an anionic active part positioned at one terminal of the active polymer and an alkoxy group of the alkoxysilane-based compound, modification may be performed in the coupled form of one terminal of the active polymer with a silyl group. Accordingly, from the functional group derived from the modifier, present at one terminal of a first copolymer unit, the affinity of a modified conjugated diene-based polymer including the first copolymer unit with an inorganic filler may be improved, and thus, effects of further improving the viscoelasticity of a rubber composition including a modified conjugated diene-based polymer may be achieved. Also, if the alkoxysilane-based compound contains a nitrogen atom, improving effects of additional physical properties derived from the nitrogen atom may be expected in addition to the effects derived from the silyl group.

According to an embodiment of the present invention, the modifier may include a compound represented by Formula 2 below.

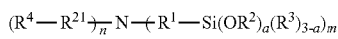

[Formula 2]

In Formula 2, $R^1$ may be a single bond, or an alkylene group of 1 to 10 carbon atoms, $R^2$ and $R^3$ may be each independently an alkyl group of 1 to 10 carbon atoms, $R^4$ may be hydrogen, an alkyl group of 1 to 10 carbon atoms, a monosubstituted, disubstituted or trisubstituted alkylsilyl group with alkyl groups of 1 to 10 carbon atoms, or a heterocyclic group of 2 to 10 carbon atoms, $R^{21}$ may be a single bond, an alkylene group of 1 to 10 carbon atoms, or $-[R^{42}O]_j-$, $R^{42}$ may be an alkylene group of 1 to 10 carbon atoms, a and m may be each independently an integer selected from 1 to 3, n may be an integer of 0, 1 or 2, and j may be an integer selected from 1 to 30.

In a particular embodiment, in Formula 2, $R^1$ may be a single bond, or an alkylene group of 1 to 5 carbon atoms, $R^2$ and $R^3$ may be each independently hydrogen or an alkyl group of 1 to 5 carbon atoms, $R^4$ may be hydrogen, an alkyl group of 1 to 5 carbon atoms, a trialkylsilyl group substituted with an alkyl group of 1 to 5 carbon atoms, or a heterocyclic group of 2 to 5 carbon atoms, $R^{21}$ may be a single bond, an alkylene group of 1 to 5 carbon atoms, or $-[R^{42}O]_j-$, $R^{42}$ may be an alkylene group of 1 to 5 carbon atoms, a may be an integer of 2 to 3, m may be an integer selected from 1 to 3, n may be an integer of 0, 1 or 2, where m+n=3 may be satisfied, and j may be an integer selected from 1 to 10.

In Formula 2, if $R^4$ is the heterocyclic group, the heterocyclic group may be substituted or unsubstituted with a trisubstituted alkoxysilyl group, and if the heterocyclic group is substituted with the trisubstituted alkoxysilyl group, the trisubstituted alkoxysilyl group may be substituted via the connection with the heterocyclic group by an alkylene group of 1 to 10 carbon atoms, and the trisubstituted alkoxysilyl group may mean an alkoxysilyl group substituted with an alkoxy group of 1 to 10 carbon atoms.

As more particular examples, the compound represented by Formula 2 may be one selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl)-methyl-1-amine, N,N-bis(3-(triethoxysilyl)propyl)-methyl-1-amine, N,N-diethyl-3-(trimethoxysilyl)propan-1-amine, N,N-diethyl-3-(triethoxysilyl)propan-1-amine, tri(trimethoxysilyl)amine, tri-(3-(trimethoxysilyl)propyl)amine, N,N-bis(3-(diethoxy(methyl)silyl)propyl)-1,1,1-trimethlysilanamine, N,N-bis(3-(1H-imidazol-1-yl)propyl)-(triethoxysilyl)methan-1-amine, N-(3-(1H-1,2,4-triazole-1-yl)propyl)-3-(trimethoxysilyl)-N-(3-(trimethoxysilyl)propyl)propan-1-amine, 3-(trimethoxysilyl)-N-(3-(trimethoxysilyl)propyl)-N-(3-(1-(3-(trimethoxysilyl)propyl)-1H-1,2,4-triazol-3-yl)propyl) propan-1-amine, N,N-bis(2-(2-methoxyethoxy)ethyl)-3-(triethoxysilyl)propan-1-amine, N,N-bis(3-(triethoxysilyl) propyl)-2,5,8,11,14-pentaoxahexadecan-16-amine, N-(2,5, 8,11,14-pentaoxahexadecan-16-yl)-N-(3-(triethoxysilyl) propyl)-2,5,8,11,14-pentaoxahexadecan-16-amine and N-(3, 6,9,12-tetraoxahexadecyl)-N-(3-(triethoxysilyl)propyl)-3,6, 9,12-tetraoxahexadecan-1-amine.

In another embodiment, the modifier may include a compound represented by Formula 3 below.

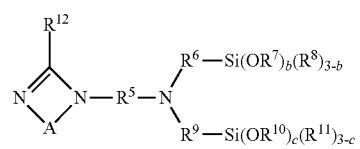

[Formula 3]

In Formula 3, $R^5$, $R^6$ and $R^9$ may be each independently an alkylene group of 1 to 10 carbon atoms, $R^7$, $R^8$, $R^{10}$ and $R^{11}$ may be each independently an alkyl group of 1 to 10 carbon atoms, $R^{12}$ may be hydrogen or an alkyl group of 1 to 10 carbon atoms, b and c may be each independently 0, 1, 2 or 3, b+c≥1 may be satisfied, and A may be

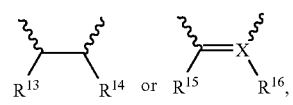

where $R^{13}$, $R^{14}$, $R^{15}$ and $R^{16}$ may be each independently hydrogen, or an alkyl group of 1 to 10 carbon atoms.

In a particular embodiment, the compound represented by Formula 3 may be one selected from the group consisting of N-(3-(1H-imidazol-1-yl)propyl)-3-(triethoxysilyl)-N-(3-(triethoxysilyl)propyl)propan-1-amine) and 3-(4,5-dihydro-1H-imidazol-1-yl)-N,N-bis(3-(triethoxysilyl)propyl)propan-1-amine.

In another embodiment, the modifier may include a compound represented by Formula 4 below.

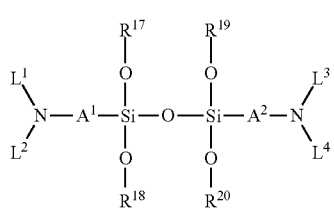

[Formula 4]

In Formula 4, $A^1$ and $A^2$ may be each independently a divalent hydrocarbon group of 1 to 20 carbon atoms, which contains an oxygen atom or not, $R^{17}$ to $R^{20}$ may be each independently a monovalent hydrocarbon group of 1 to 20 carbon atoms, $L^1$ to $L^4$ may be each independently a monosubstituted, disubstituted or trisubstituted alkylsilyl group with alkyl groups of 1 to 10 carbon atoms, or a monovalent hydrocarbon group of 1 to 20 carbon atoms, wherein $L^1$ and $L^2$, and $L^3$ and $L^4$ may be combined with each other to form rings of 1 to 5 carbon atoms, and if $L^1$ and $L^2$, and $L^3$ and $L^4$ are combined with each other to form rings, the rings thus formed may include one to three heteroatoms of one or more types selected from the group consisting of N, O and S.

In a particular embodiment, in Formula 4, $A^1$ and $A^2$ may be each independently an alkylene group of 1 to 10 carbon atoms, $R^{17}$ to $R^{20}$ may be each independently an alkyl group of 1 to 10 carbon atoms, $L^1$ to $L^4$ may be each independently a trialkylsilyl group substituted with an alkyl group of 1 to 5 carbon atoms, or an alkyl group of 1 to 10 carbon atoms, wherein $L^1$ and $L^2$, and $L^3$ and $L^4$ may be combined with each other to form rings of 1 to 3 carbon atoms, and if $L^1$ and $L^2$, and $L^3$ and $L^4$ are combined with each other to form rings, the rings thus formed may include one to three heteroatoms of one or more types selected from the group consisting of N, O and S.

In a more particular embodiment, the compound represented by Formula 4 may be one selected from the group consisting of 3,3'-(1,1,3,3-tetramethoxydisiloxane-1,3-diyl)bis(N,N-dimethylpropan-1-amine, 3,3'-(1,1,3,3-tetraethoxydisiloxane-1,3-diyl)bis(N,N-dimethylpropan-1-amine), 3,3'-(1,1,3,3-tetrapropoxydisiloxane-1,3-diyl)bis(N,N-dimethylpropan-1-amine), 3,3'-(1,1,3,3-tetramethoxydisiloxane-1,3-diyl)bis(N,N-diethylpropan-1-amine), 3,3'-(1,1,3,3-tetramethoxydisiloxane-1,3-diyl)bis(N,N-dimpropylpropan-1-amine), 3,3'-(1,1,3,3-tetraethoxydisiloxane-1,3-diyl)bis(N,N-diethylpropan-1-amine), 3,3'-(1,1,3,3-tetrapropoxydisiloxane-1,3-diyl)bis(N,N-diethylpropan-1-amine), 3,3'-(1,1,3,3-tetraethoxydisiloxane-1,3-diyl)bis(N,N-dipropylpropan-1-amine), 3,3'-(1,1,3,3-tetrapropoxydisiloxane-1,3-diyl)bis(N,N-dipropylpropan-1-amine), 3,3'-(1,1,3,3-tetramethoxydisiloxane-1,3-diyl)bis(N,N-diethylmethan-1-amine), 3,3'-(1,1,3,3-tetraethoxydisiloxane-1,3-diyl)bis(N,N-diethylmethan-1-amine), 3,3'-(1,1,3,3-tetrapropoxydisiloxane-1,3-diyl)bis(N,N-diethylmethan-1-amine), 3,3'-(1,1,3,3-tetramethoxydisiloxane-1,3-diyl)bis(N,N-dimethylmethan-1-amine), 3,3'-(1,1,3,3-tetramethoxydisiloxane-1,3-diyl)bis(N,N-dipropylmethan-1-amine), 3,3'-(1,1,3,3-tetrapropoxydisiloxane-1,3-diyl)bis(N,N-dimethylmethan-1-amine), 3,3'-(1,1,3,3-tetrapropoxydisiloxane-1,3-diyl)bis(N,N-dipropylmethan-1-amine), 3,3'-(1,1,3,3-tetraethoxydisiloxane-1,3-diyl)bis(N,N-dimethylmethan-1-amine), 3,3'-(1,1,3,3-tetraethoxydisiloxane-1,3-diyl)bis(N,N-dipropylmethan-1-amine), N,N'-((1,1,3,3-tetramethoxydisiloxane-1,3-diyl)bis(propan-3,1-diyl))bis(1,1,1-trimethyl-N-(trimethylsilyl)silanamine, N,N'-((1,1,3,3-tetraethoxydisiloxane-1,3-diyl)bis(propan-3,1-diyl))bis(1,1,1-trimethyl-N-(trimethylsilyl)silanamine, N,N'-((1,1,3,3-tetrapropoxydisiloxane-1,3-diyl)bis(propan-3,1-diyl))bis(1,1,1-trimethyl-N-(trimethylsilyl)silanamine, N,N'-((1,1,3,3-tetramethoxydisiloxane-1,3-diyl)bis(propan-3,1-diyl))bis(1,1,1-trimethyl-N-phenylsilanamine, N,N'-((1,1,3,3-tetraethoxydisiloxane-1,3-diyl)bis(propan-3,1-diyl))bis(1,1,1-trimethyl-N-phenylsilanamine, N,N'-((1,1,3,3-tetrapropoxydisiloxane-1,3-diyl)bis(propan-3,1-diyl))bis(1,1,1-trimethyl-N-phenylsilanamine, 1,3-bis(3-(1H-imidazol-1-yl)propyl)-1,1,3,3-tetramethoxydisiloxane, 1,3-bis(3-(1H-imidazol-1-yl)propyl)-1,1,3,3-tetraethoxydisiloxane, and 1,3-bis(3-(1H-imidazol-1-yl)propyl)-1,1,3,3-tetrapropoxydisiloxane.

In another embodiment, the modifier may include a compound represented by Formula 5 below.

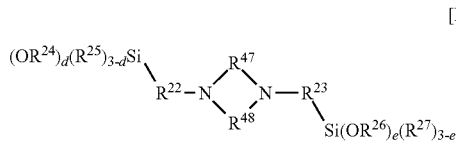

[Formula 5]

In Formula 5, $R^{22}$ and $R^{23}$ may be each independently an alkylene group of 1 to 20 carbon atoms, or $-R^{28}[OR^{29}]_f-$, $R^{24}$ to $R^{27}$ may be each independently an alkyl group of 1 to 20 carbon atoms or an aryl group of 6 to 20 carbon atoms, $R^{28}$ and $R^{29}$ may be each independently an alkylene group of 1 to carbon atoms, $R^{47}$ and $R^{48}$ may be each independently a divalent hydrocarbon group of 1 to 6 carbon atoms, d and e may be each independently an integer selected from 0, or 1 to 3, where d+e is an integer of 1 or more, and f may be an integer of 1 to 30.

Particularly, in Formula 5, $R^{22}$ and $R^{23}$ may be each independently an alkylene group of 1 to 10 carbon atoms, or $-R^{29}[OR^{29}]_f-$, $R^{24}$ to $R^{27}$ may be each independently an alkyl group of 1 to 10 carbon atoms, $R^{28}$ and $R^{29}$ may be each independently an alkylene group of 1 to 10 carbon atoms, d and e may be each independently an integer selected from 0, or 1 to 3, where d+e is an integer of 1 or more, and f may be an integer of 1 to 30.

More particularly, the compound represented by Formula 5 may be a compound represented by Formula 5a, Formula 5b or Formula 5c below.

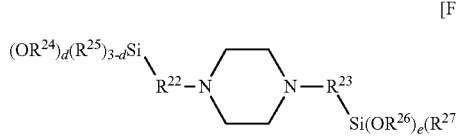

[Formula 5a]

-continued

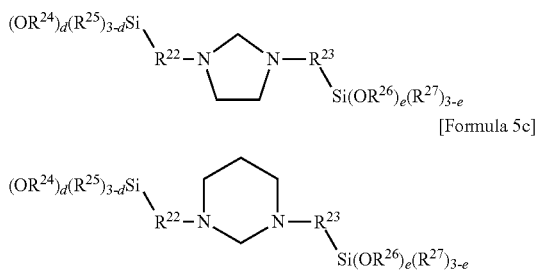

[Formula 5b]

[Formula 5c]

In Formula 5a, Formula 5b and Formula 5c, $R^{22}$ to $R^{27}$, d and e are the same as described above.

In a more particular embodiment, the compound represented by Formula 5 may be one selected from the group consisting of 1,4-bis(3-(3-(triethoxysilyl)propoxy)propyl) piperazine, 1,4-bis(3-(triethoxysilyl)propyl)piperazine, 1,4-bis(3-(trimethoxysilyl)propyl)piperazine, 1,4-bis(3-(dimethoxymethylsilyl)propyl)piperazine, 1-(3-(ethoxydimethlylsilyl)propyl)-4-(3-(triethoxysilyl)propyl) piperazine, 1-(3-(ethoxydimethyl)propyl)-4-(3-(triethoxysilyl)methyl)piperazine, 1-(3-(ethoxydimethyl) methyl)-4-(3-(triethoxysilyl)propyl)piperazine, 1,3-bis(3-(triethoxysilyl)propyl)imidazolidine, 1,3-H]스 (3-(dimethoxyethylsilyl)propyl)imidazolidine, 1,3-bis(3-(trimethoxysilyl)propyl)hexahydropyrimidine, 1,3-bis(3-(triethoxysilyl)propyl)hexahydropyrimidine and 1,3-bis(3-(tributoxysilyl)propyl)-1,2,3,4-tetrahydropyrimidine.

In another embodiment, the modifier may include a compound represented by Formula 6 below.

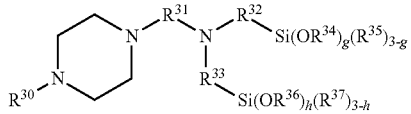

[Formula 6]

In Formula 6, $R^{30}$ may be a monovalent hydrocarbon group of 1 to 30 carbon atoms, $R^{31}$ to $R^{33}$ may be each independently an alkylene group of 1 to 10 carbon atoms, $R^{34}$ to $R^{37}$ may be each independently an alkyl group of 1 to 10 carbon atoms, and g and h may be each independently an integer selected from 0, or 1 to 3, where g+h may be an integer of 1 or more.

In another embodiment, the modifier may include a compound represented by Formula 7 below.

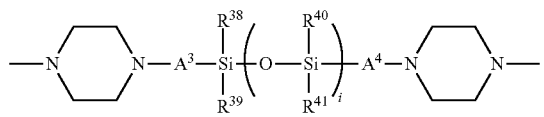

[Formula 7]

In Formula 7, $A^3$ and $A^4$ may be each independently an alkylene group of 1 to 10 carbon atoms, $R^{38}$ to $R^{41}$ may be each independently an alkyl group of 1 to 10 carbon atoms or an alkoxy group of 1 to 10 carbon atoms, and i may be an integer selected from 1 to 30.

In another embodiment, the modifier may include one or more selected from the group consisting of 3,4-bis(2-methoxyethoxy)-N-(4-(trimethylsilyl)butyl)aniline, N,N-diethyl-3-(7-methyl-3,6,8,11-tetraoxa-7-silatridecan-7-yl)propan-1-amine, 2,4-bis(2-methoxyethoxy)-6-((trimethylsilyl) methyl)-1,3,5-triazine and 3,14-dimethoxy-3,8,8,13-tetramethyl-2,14-dioxa-7,9-dithia-3,8,13-trisilapentadecane.

In another embodiment, the modifier may include a compound represented by Formula 8 below.

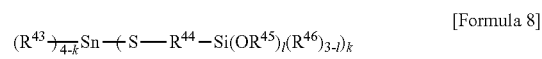

[Formula 8]

In Formula 8, $R^{43}$, $R^{45}$ and $R^{46}$ may be each independently an alkyl group of 1 to 10 carbon atoms, $R^{44}$ may be an alkylene group of 1 to 10 carbon atoms, and k may be an integer selected from 1 to 4.

In a more particular embodiment, the compound represented by Formula 8 may be one selected from the group consisting of 8,8-dibutyl-3,13-dimethoxy-3,13-dimethyl-2, 14-dioxa-7,9-dithia-3,13-disila-8-stannapentadecane, 8,8-dimetyl-3,13-dimethoxy-3,13-dimethyl-2,14-dioxa-7,9-dithia-3,13-disila-8-stannapentadecane, 8,8-dibutyl-3,3,13, 13-tetramethoxy-2,14-dioxa-7,9-dithia-3,13-disila-8-stannapentadecane and 8-butyl-3,3,13,13-tetramethoxy-8-((3-(trimethoxysilyl)propyl)thio)-2,14-dioxa-7,9-dithia-3, 13-disila-8-stannapentadecane.

Method for Preparing Modified Conjugated Diene-Based Polymer

The present invention provides a method for preparing a modified conjugated diene-based polymer, by which a modified conjugated diene-based polymer satisfying conditions (i) to (vii) above at the same time.

In the preparation method according to the present invention, polymerization reaction is performed by applying an oligomer having an anionic active terminal as a polymerization initiator and injecting thereof in at least two installments during polymerizing an active polymer, and an active polymer having broad molecular weight distribution may be prepared in conditions not high-temperature conditions. Accordingly, defects on deactivating the active part of the active polymer due to high temperature may not be generated, and modification reaction between the active polymer and a modifier may be favorably achieved, thereby easily preparing a modified conjugated diene-based polymer having broad molecular weight distribution and a high modification ratio.

The preparation method of the modified conjugated diene-based polymer is characterized in including: polymerizing a conjugated diene-based monomer, or a conjugated diene-based monomer and an aromatic vinyl-based monomer in a hydrocarbon solvent to prepare an active polymer (S1); and reacting or coupling the active polymer prepared in step (S1) and a modifier (S2), wherein the polymerization in step (S1) is performed by initiating polymerization in the presence of a first polymerization initiator and injecting a second polymerization initiator in at least one installment at a point where a polymerization conversion ratio is 50% to 95%, the first and second polymerization initiators are oligomers prepared by reacting an organometallic compound, a conjugated diene-based monomer and a compound represented by Formula 1 and having an anionic active terminal, step (S1) is continuously performed in at least two polymerization reactors, and a polymerization conversion ratio in the first reactor among the polymerization reactors is 10% to 50%.

The conjugated diene-based monomer, the aromatic vinyl-based monomer and the compound represented by Formula 1 used in the preparation method are the same as described above, and the particular description thereon will be omitted.

The hydrocarbon solvent is not specifically limited, but may be, for example, one or more selected from the group consisting of n-pentane, n-hexane, n-heptane, isooctane, cyclohexane, toluene, benzene and xylene.

Step S1

The polymerization in step (S1) may be, for example, anionic polymerization, and particularly, living anionic polymerization by which an anionic active part is formed at the polymerization terminal through propagation reaction by anions. In addition, the polymerization in step (S1) may be a polymerization with heating, an isothermal polymerization, or a polymerization at a constant temperature (adiabatic polymerization). Here, the polymerization at a constant temperature may mean a polymerization method including a step of polymerizing using self-generated heat of reaction without optionally applying heat after injecting a polymerization initiator, and the polymerization with heating may mean a polymerization method including injecting the polymerization initiator and then, increasing the temperature by optionally applying heat. The isothermal polymerization may mean a polymerization method by which the temperature of a polymer is kept constant by increasing heat by applying heat or taking heat after adding the polymerization initiator.

In addition, the polymerization in step (S1) is performed by reacting a conjugated diene-based monomer, or a conjugated diene-based monomer and an aromatic vinyl-based monomer in the presence of a polymerization initiator in a hydrocarbon solvent, and particularly may be performed by initiating polymerization in the presence of a first polymerization initiator and performing polymerization reaction by injecting a second polymerization initiator in at least one installment at a point where a polymerization conversion ratio is 50% to 95%. In the polymerization of step (S1), the second polymerization initiator is injected in at least one installment at a point of the above-described polymerization conversion ratio for the reaction of a monomer to easily form a new polymer chain separate from the polymer chain initially produced, and accordingly, in the active polymer thus prepared, a large amount of polymer chains having different molecular weights may be present in the active polymer, and the active polymer may have broad molecular weight distribution.

Here, the first and second polymerization initiators may be the same or different, and if the same, "the first" and "the second" may mean injection order to the reaction.

In addition, the first and second polymerization initiators are oligomers having an anionic active terminal, prepared by reacting an organometallic compound, a conjugated diene-based monomer and a compound represented by Formula 1, and may have a weight average molecular weight of 100 g/mol to 30,000 g/mol, or 150 g/mol to 15,000 g/mol.

In another embodiment, the oligomer includes a repeating unit derived from a conjugated diene-based monomer and a repeating unit derived from a compound represented by Formula 1 in a molecule, and in this case, the repeating numbers of the repeating unit derived from the conjugated diene-based monomer and the repeating unit derived from the compound represented by Formula 1 may be controlled in ranges for the oligomer satisfying the above-described weight average molecular weight range.

In addition, the oligomer having an anionic active terminal may be prepared by anionic polymerization of a conjugated diene-based monomer and a compound represented by Formula 1 in the presence of an organometallic compound, and in this case, the amounts used of the conjugated diene-based monomer and the compound represented by Formula 1 may be controlled so as to satisfy the above-described weight average molecular weight range. For example, the organometallic compound may be used in 0.001 mol to 1.0 mol, or 0.01 mol to 1.0 mol based on 1 mol of the conjugated diene-based monomer, and the compound represented by Formula 1 may be used in 0.001 mol to 100 mol, or 0.01 mol to 10 mol based on 1 mol of the conjugated diene-based monomer.

According to an embodiment of the present invention, step (S1) may use the polymerization initiator in 0.01 mmol to 10 mmol based on total 100 g of the monomer, and here, the polymerization initiator may include the first and second polymerization initiators. Particularly, the polymerization initiator may be used in 0.05 mmol to 5 mmol, 0.1 mmol to 2 mmol, 0.1 mmol to 1 mmol, or 0.15 to 0.8 mmol based on total 100 g of the monomer.

In addition, the second polymerization initiator may be used in 0.001 mol to 100 mol, or 0.1 mol to 10 mol based on 1 mol of the first polymerization initiator.

In the present invention, the organometallic compound may be, for example, one or more selected from the group consisting of methyllithium, ethyllithium, propyllithium, isopropyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

In addition, the injection of the second polymerization initiator in installments may be batch injection in installments or continuous injection in installments, and particularly, the injection in installments may include first continuous injection in installments of a portion of the total amount of the second polymerization initiator at a point where a polymerization conversion ratio is 50% to less than 80% and second continuous injection in installments of the remainder among the total amount at a point where a polymerization conversion ratio is 80% to 95%, the continuous injection in installments may be injection of the total amount injected from the initiation of the injection to the end of the injection at a constant rate with a constant amount.

In addition, according to an embodiment of the present invention, the polymerization in step (S1) is performed in two or more polymerization reactors, and a polymerization conversion ratio in the first polymerization reactor among the polymerization reactors may be 10% to 50%, or 20% to 50%. That is, the polymerization in step (S1) may be performed only until the polymerization conversion ratio in the first polymerization reactor becomes 10% to 50%, or 20% to 50%. Within this range, side reactions generated while forming a polymer after initiating polymerization reaction may be restrained and a polymer with a linear structure may be induced during polymerization, and the monomer exhausted at the initial stage of the reaction may be controlled to easily control the amount of the monomer capable of reacting with the second polymerization initiator injected in installments. Accordingly, the aforementioned unimodal molecular weight distribution curve may be obtained, and the aforementioned molecular weight distribution may be satisfied. In this case, the polymerization conversion ratio may be controlled according to the reaction temperature, the retention time in the reactor, etc.

More particularly, the polymerization in step (S1) may be performed in two or more polymerization reactors, a conjugated diene-based monomer, or a conjugated diene-based monomer and an aromatic vinyl-based monomer may be polymerized in the presence of a first polymerization initiator in a hydrocarbon solvent in the first polymerization reactor until a polymerization conversion ratio becomes 10% to 50% to prepare an active polymer having the polymerization conversion ratio, and the polymerization may be continued in a second polymerization reactor and subsequent polymerization reactors to prepare the active polymer. The second polymerization initiator may be injected in at least one installment during polymerization at a point where a polymerization conversion ratio is 50% to 95%. In this case, the injection of the second polymerization initiator in installments may be performed by injecting into a first reactor, a second reactor, and a subsequent polymerization reactor according to the point of the polymerization conversion ratio.

Meanwhile, the polymerization in step (S1) may be performed by further including a polar additive as necessary, and in this case, the total amount used of the polar additive may be in a ratio of 0.001 g to 50 g, or 0.002 g to 1.0 g based on total 100 g of the monomer. In another embodiment, the total amount used of the polar additive may be in a ratio of greater than 0 g to 1 g, 0.01 g to 1 g, or 0.1 g to 0.9 g based on total 100 g of the polymerization initiator.

The polar additive may be, for example, one or more selected from the group consisting of tetrahydrofuran, ditetrahydrofurylpropane, diethyl ether, cyclopentyl ether, dipropyl ether, ethylene methyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, and tetramethylethylenediamine, and may particularly be triethylamine or tetramethylethylenediamine.

Meanwhile, the polymerization conversion ratio may be determined by, for example, measuring the solid concentration in a copolymer solution phase including the copolymer during polymerization, and in a particular embodiment, in order to secure the copolymer solution, a cylinder type container is installed at the outlet of each polymerization reactor to fill up a certain amount of the copolymer solution in the cylinder type container, and then, the cylinder type container is separated from the reactor, the weight (A) of the cylinder filled with the copolymer solution is measured, the copolymer solution filled in the cylinder type container is transported to an aluminum container, for example, an aluminum dish, the weight (B) of the cylinder type container from which the copolymer solution is removed is measured, the aluminum container containing the copolymer solution is dried in an oven of 140° C. for 30 minutes, the weight (C) of a dried polymer is measured, and calculation is performed according to Mathematical Formula 3 below.

[Mathematical Formula 3]

$$\text{Polymer conversion ratio (\%)} = \frac{\text{Weight }(C)}{[(\text{Weight }(A) - \text{Weight }(B)) \times \text{Total solid content }(TSC)]} \times 100$$

In Mathematical Formula 3, the total solid content is the total solid content in a copolymer solution separated from each reactor and is the weight percent of the solid content with respect to 100% of the copolymer solution. For example, if the total solid content is 20 wt %, calculation may be performed by substituting 20/100, i.e., 0.2 in Mathematical Formula 3.

Meanwhile, the polymerization reactant polymerized in the first reactor may be transported to polymerization reactors before a modification reactor in order, and polymerization may be performed until the final polymerization conversion ratio becomes greater than 95%. After performing the polymerization in the first reactor, the polymerization conversion ratio for each reactor of the second reactor, or from the second reactor to the polymerization reactor before the modification reactor may be suitably controlled to control molecular weight distribution.

In addition, the active polymer prepared by step (S1) may mean a polymer in which a polymer anion and the organometallic cation of the polymerization initiator are combined.

In addition, the polymerization in step (S1) may be performed, for example, in a temperature range of 100° C. or less, 50° C. to 100° C., or 50° C. to 80° C., and within this range, the conversion ratio of the polymerization reaction may be increased.

The term "polymerization reactant" in the present invention may mean an intermediate of a polymer type, which is under polymerization in each reactor during performing step (S1) or may mean a polymer with a polymerization conversion ratio of 95% or less under polymerization in a reactor, after finishing step (S1) or step (S2) and prior to obtaining the active polymer or the modified conjugated diene-based polymer.

Step S2

According to an embodiment of the present invention, in the reaction of step (S2), the modifier may be used in an amount of 0.01 mmol to 10 mmol based on total 100 g of the monomer. In another embodiment, the modifier may be used in a molar ratio of 1:0.1 to 10, 1:0.1 to 5, or 1:0.1 to 1:3, based on 1 mol of the polymerization initiator in step (S1).

In addition, according to an embodiment of the present invention, the modifier may be injected into a modification reactor, and step (S2) may be conducted in the modification reactor. In another embodiment, the modifier may be injected into a transporting part for transporting the active polymer prepared in step (S1) to a modification reactor for conducting step (S2), and the reaction may be performed by the mixing of the active polymer and the modifier in the transporting part. In this case, the reaction may be modification reaction for simply coupling the modifier with the active polymer, or coupling reaction for connecting the active polymer based on the modifier.

Rubber Composition

According to the present invention, a rubber composition including the modified conjugated diene-based polymer is provided.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effects of excellent balance between physical properties may be achieved.

In addition, the rubber composition may further include other rubber components, if necessary, in addition to the modified conjugated diene-based polymer, and in this case, the rubber components may be included in an amount of 90 wt % or less based on the total weight of the rubber composition. In a particular embodiment, the other rubber components may be included in 1 part by weight to 900 parts by weight based on 100 parts by weight of the modified conjugated diene-based polymer.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), polybutadiene (BR), polyisoprene (IR), a butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), a polysulfide rubber, an acryl rubber, a urethane rubber, a silicone rubber, an epichlorohydrin rubber, and a halogenated butyl rubber, and any one or mixtures of two or more thereof may be used.

The rubber composition may include a filler in 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, colloid silica, etc., and preferably, the filler may be wet silica which has the most significant improving effect of destruction characteristics and compatible effect of wet grip. In addition, the rubber composition may further include a carbon-based filler, as necessary.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl) tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or mixtures of two or more thereof may be used. Preferably, bis(3-triethoxysilylpropyl)polysulfide or 3-trimethoxysilylpropylbenzothiazyltetrasulfide may be used in consideration of the improving effects of reinforcing properties.

In addition, in the rubber composition according to an embodiment of the present invention, since a modified conjugated diene-based polymer in which a functional group having high affinity with silica is introduced in an active part is used as a rubber component, the compounding amount of the silane coupling agent may be smaller than a common case. Thus, the silane coupling agent may be used in 1 part by weight to 20 parts by weight, or 5 parts by weight to 15 parts by weight based on 100 parts by weight of silica, and within the above range, effects as a coupling agent may be sufficiently shown, and effects of preventing gelation of a rubber component may be achieved.

The rubber composition according to an embodiment of the present invention may be sulfur crosslinkable, and may further include a vulcanizing agent. The vulcanizing agent may particularly be a sulfur powder and may be included in 0.1 parts by weight to 10 parts by weight based on 100 parts by weight of a rubber component, and within the range, elasticity and strength required for a vulcanized rubber composition may be confirmed, and at the same time, an excellent low fuel consumption ratio may be achieved.

The rubber composition according to an embodiment of the present invention may further include various additives used in a common rubber industry in addition to the above-described components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in 0.1 parts by weight to 5 parts by weight based on 100 parts by weight of the rubber component.

The process oil acts as a softener in a rubber composition and may include, for example, paraffin-based, naphthene-based, or aromatic compounds. The aromatic process oil may be used in consideration of tensile strength and abrasion resistance, and the naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a compounding prescription, and a rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may be a tire or include a tire tread.

EXAMPLES

Hereinafter, embodiments will be explained in detail to particularly explain the present invention. However, the embodiments according to the present invention may be modified into various other types, and the scope of the present invention should not be limited to the embodiments described below. The embodiments of the present invention are provided for completely explaining the present invention to a person having an average knowledge in the art.

Preparation Example 1

Under a nitrogen atmosphere, to a 5 L, pressurized reactor, 100 g (10 wt % in n-hexane) of n-butyllithium was put, and 2,000 g of n-hexane, 337 g of 1,3-butadiene and 23.0 g of 4-(dimethylamino)styrene were added thereto, followed by reacting at 40° C. for 20 minutes to prepare an oligomer solution including 14.9 wt % of an oligomer having an anionic active terminal and a weight average molecular weight of 3,100 g/mol.

Preparation Example 2

An oligomer solution including 15.1 wt % of an oligomer having an anionic active terminal and a weight average molecular weight of 3,200 g/mol was prepared by performing the same reaction as in Preparation Example 1 except for using 25 g of N,N-dimethylvinylbenzylamine instead of 4-(dimethylamino)styrene in Preparation Example 1.

Example 1

To a first reactor among three continuous stirring liquid phase reactors (CSTR), continuously injected were n-hexane in a flow rate of 4 kg/hr, a monomer solution in which 60 wt % of a monomer mixture (80 wt % of 1,3-butadiene and 20 wt % of styrene) was dissolved in n-hexane in a flow rate of 1.6 kg/h, an oligomer solution prepared in Preparation Example 1 in n-hexane as a polymerization initiator in a flow rate of 139 g/hr, a polar additive solution in which 10 wt % of ditetrahydrofurylpropane was dissolved in n-hexane as a polar additive in a flow rate of 0.5 g/hr, and a solution in which 15 wt % of 1,2-butadiene was dissolved in n-hexane in a flow rate of 1 g/hr. In this case, the internal temperature of the reactor was maintained to 50° C., and when a polymerization conversion ratio reached 45%, a polymerization product was transported from the first reactor to a second reactor through a transport pipe.

Then, the temperature of the second reactor was maintained to 65° C., and when a polymerization conversion ratio reached 85%, while transporting a polymerization product from the second reactor to a third reactor through a transport pipe, the oligomer solution prepared in Preparation Example 1 was injected to the pipe in a rate of 146 g/h.

Then, the temperature of the third reactor was maintained to 65° C., and when a polymerization conversion ratio reached 98% or more, a polymerization product was continuously supplied from the third reactor to a fourth reactor through a transport pipe, and a solution in which 20 wt % of N,N-bis(3-(dimethoxy(methyl)silyl)propyl)-methyl-1-amine was dissolved in n-hexane was continuously supplied as a modifier to perform modification reaction (act.Li:modifier=1:0.5 molar ratio).

After that, to a polymerization solution discharged from the third reactor, an IR1520 (BASF Co.) solution in which 30 wt % was dissolved as an antioxidant, was injected in a rate of 100 g/h and stirred. The polymer thus obtained was injected into hot water heated with steam and stirred to remove solvents and roll dried to remove remaining solvents and water to prepare a both-terminal modified conjugated diene-based polymer.

Example 2

A modified conjugated diene-based polymer was prepared by performing the same method as in Example 1 except for injecting the oligomer solution prepared in Preparation Example 1 to the pipe in a rate of 147 g/h, while transporting a polymerization product from the second reactor to the third reactor through the transport pipe at a point where the polymerization conversion ratio reached 95%, in Example 1 (act.Li:modifier=1:0.5 molar ratio).

Example 3

A modified conjugated diene-based polymer was prepared by performing the same method as in Example 1 except for injecting the oligomer solution prepared in Preparation Example 1 to the pipe in a rate of 147 g/h, while transporting a polymerization product from the second reactor to the third reactor through the transport pipe at a point where the polymerization conversion ratio reached 75%, in Example 1 (act.Li:modifier=1:0.5 molar ratio).

Example 4

A modified conjugated diene-based polymer was prepared by performing the same method as in Example 1 except for injecting the oligomer solution prepared in Preparation Example 1 to the pipe in a rate of 147 g/h, while transporting a polymerization product from the second reactor to the third reactor through the transport pipe at a point where the polymerization conversion ratio reached 80%, and continuously injecting a solution in which 20 wt % of N-(4-methylpiperazinyl)-N,N-bis(3-(triethoxysilyl)propyl)amine was dissolved as a modifier to the fourth reactor, in Example 1 (act.Li:modifier=1:0.5 molar ratio).

Example 5

To a first reactor among three continuous stirring liquid phase reactors (CSTR), continuously injected were n-hexane in a flow rate of 4 kg/hr, a monomer solution in which 60 wt % of a monomer mixture (80 wt % of 1,3-butadiene and 20 wt % of styrene) was dissolved in n-hexane in a flow rate of 1.6 kg/h, an oligomer solution prepared in Preparation Example 2 in n-hexane as a polymerization initiator in a flow rate of 156 g/hr, a polar additive solution in which 10 wt % of ditetrahydrofurylpropane was dissolved in n-hexane as a polar additive in a flow rate of 0.5 g/hr, and a solution in which 15 wt % of 1,2-butadiene was dissolved in n-hexane in a flow rate of 1 g/hr. In this case, the internal temperature of the reactor was maintained to 50° C., and when a polymerization conversion ratio reached 45%, a polymerization product was transported from the first reactor to a second reactor through a transport pipe.

Then, the temperature of the second reactor was maintained to 65° C., and when a polymerization conversion ratio reached 85%, while transporting a polymerization product from the second reactor to a third reactor through a transport pipe, the oligomer solution prepared in Preparation Example 2 was injected to the pipe in a rate of 147 g/h.

Then, the temperature of the third reactor was maintained to 65° C., and when a polymerization conversion ratio reached 98% or more, a polymerization product was continuously supplied from the third reactor to a fourth reactor through a transport pipe, and a solution in which 20 wt % of N-(3-(1H-imidazol-1-yl)propyl-N,N-bis(3-(triethoxysilyl)propyl)amine was dissolved in n-hexane was continuously supplied as a modifier to perform modification reaction (act.Li:modifier=1:0.5 molar ratio).

After that, to a polymerization solution discharged from the third reactor, an IR1520 (BASF Co.) solution in which 30 wt % was dissolved as an antioxidant, was injected in a rate of 100 g/h and stirred. The polymer thus obtained was injected into hot water heated with steam and stirred to remove solvents and roll dried to remove remaining solvents and water to prepare a both-terminal modified conjugated diene-based polymer.

Example 6

A modified conjugated diene-based polymer was prepared by performing the same method as in Example 1 except for injecting the oligomer solution prepared in Preparation Example 2 to the pipe in a rate of 147 g/h, while transporting a polymer from the second reactor to the third reactor through the transport pipe at a point where the polymerization conversion ratio reached 70%, and continuously injecting a solution in which 20 wt % of N,N-bis(3-(dimethoxy(methyl)silyl)propyl)-methyl-1-amine was dissolved in n-hexane as a modifier to the fourth reactor, in Example 5 (act.Li:modifier=1:0.5 molar ratio).

Example 7

A modified conjugated diene-based polymer was prepared by performing the same method as in Example 2 except for continuously injecting a solution in which 20 wt % of N-(4-methylpiperazinyl)-N,N-bis(3-(triethoxysilyl)propyl)amine was dissolved in n-hexane as a modifier to the fourth reactor, in Example 2 (act.Li:modifier=1:0.5 molar ratio).

Comparative Example 1

A modified conjugated diene-based polymer was prepared by performing the same method as in Example 1 except for not injecting the oligomer solution while transporting the polymerization product from the second reactor to the third reactor through the transport pipe, in Example 1 (act.Li:modifier=1:0.5 molar ratio).

Comparative Example 2

A modified conjugated diene-based polymer was prepared by performing the same method as in Example 6 except for injecting a n-butyllithium solution in which 10 wt % of n-butyllithium was dissolved in n-hexane to the first reactor in a rate of 6.0 g/h instead of the oligomer solution as the polymerization initiator, and not injecting the polymerization initiator while transporting the polymerization product from the second reactor to the third reactor through the transport pipe, in Example 6 (act.Li:modifier=1:0.5 molar ratio).

Comparative Example 3

A modified conjugated diene-based polymer was prepared by performing the same method as in Example 1 except for injecting a n-butyllithium solution in which 10 wt % of n-butyllithium was dissolved in n-hexane to the first reactor in a rate of 6.0 g/h instead of the oligomer solution as the polymerization initiator, and injecting the n-butyllithium solution in a rate of 3.0 g/h at a point where a polymerization conversion ratio reached 43%, in Example 1 (act.Li:modifier=1:0.5 molar ratio).

Comparative Example 4

A modified conjugated diene-based polymer was prepared by performing the same method as in Example 1 except for injecting a n-butyllithium solution in which 10 wt % of n-butyllithium was dissolved in n-hexane to the first reactor in a rate of 6.0 g/h instead of the oligomer solution as the polymerization initiator, and injecting the n-butyllithium solution in a rate of 2.4 g/h at a point where a polymerization conversion ratio reached 80%, in Example 1 (act.Li:modifier=1:0.5 molar ratio).

Comparative Example 5

A modified conjugated diene-based polymer was prepared by performing the same method as in Example 5 except for continuously injecting a solution in which 20 wt % of tin tetrachloride ($SnCl_4$) was dissolved in n-hexane to the fourth reactor as the modifier, in Example 5 (act.Li:modifier=1:0.5 molar ratio).

Comparative Example 6

A modified conjugated diene-based polymer was prepared by performing the same method as in Example 5 except for not injecting the polymerization initiator while transporting the polymerization product from the second reactor to the third reactor through the transport pipe, and continuously injecting a solution in which 20 wt % tris(3-(triethoxysilyl)propyl)amine was dissolved in n-hexane to the fourth reactor as the modifier, in Example 5 (act.Li:modifier=1:0.5 molar ratio).

EXPERIMENTAL EXAMPLES

Experimental Example 1

With respect to each of the copolymers prepared in the Examples and the Comparative Examples, the styrene bond content and the 1,2-vinyl bond content, a weight average molecular weight (Mw, $\times 10^3$ g/mol), molecular weight distribution (PDI, MWD), a molecular weight distribution curve, a contraction factor, the nitrogen atom content and a modification ratio were measured, respectively, and the results are shown in Table 1 below.

1) Microstructure Analysis (Styrene Bond Content (SM)) and 1,2-Vinyl Bond Content (1,2-Vinyl)

The styrene and 1,2-vinyl bond contents in each modified conjugated diene-based polymers were measured and analyzed using Varian VNMRS 500 MHz NMR.

During measuring NMR, 1,1,2,2-tetrachloroethane was used as a solvent, and a specimen was prepared by dissolving the polymer in the solvent into 0.02 M. The styrene bond content (wt %) and the 1,2-vinyl bond content (wt %) were calculated by calculating a solvent peak as 5.97 ppm, and regarding 7.2-6.9 ppm as random styrene peaks, 6.9-6.2 ppm as block styrene peaks, 5.8-5.1 ppm as 1,4-vinyl peaks, and 5.1-4.5 ppm as 1,2-vinyl peaks.

2) Weight Average Molecular Weight (Mw), Molecular Weight Distribution (MWD) and Molecular Weight Distribution Curve By gel permeation chromatograph (GPC) (PL GPC220, Agilent Technologies), a weight average molecular weight (Mw) and a number average molecular weight (Mn) were measured under the conditions below, a molecular weight distribution curve was obtained, and molecular weight distribution (PDI, MWD, Mw/Mn) was obtained by calculating from each of the molecular weights measured.

Column: two columns of PLgel Olexis (Polymer Laboratories Co.) and one column of PLgel mixed-C (Polymer Laboratories Co.) were used in combination.
Solvent: a mixture of tetrahydrofuran and 2 wt % of an amine compound was used.
Flow rate: 1 ml/min
Specimen concentration: 1-2 mg/ml (diluted in THF)
Injection amount: 100 μl
Column temperature: 40° C.
Detector: Refractive index 3) Mooney Stress Relaxation Ratio (−S/R) and Mooney Large Relaxation Area (MLRA)

Measurement was conducted by using MV2000E of Alpha Technologies Co. using Large Rotor at a rotor speed of 2±0.02 rpm at 100° C. Particularly, a polymer was stood at room temperature (23±5° C.) for 30 minutes or more, and 27±3 g was collected and put in a die cavity, and then, Platen was operated and measurement was conducted for 4 minutes to obtain a mooney viscosity. After that, the slope value of the change of the mooney viscosity shown while releasing torque was measured, and the mooney stress relaxation ratio was obtained as the absolute value thereof. In addition, the mooney large relaxation area is an integration value of a mooney relaxation curve from 1 second to 120 seconds after stopping a rotor, and calculation was conducted by Mathematical Formula 1 below.

$$A = \frac{k}{(a+1)}\left[t_f^{(a+1)} - t_o^{(a+1)}\right]$$ [Mathematical Formula 1]

In Mathematical Formula 1,
A is a mooney large relaxation area (MLRA),
k is a mooney intercept after 1 second from stopping operation of a rotor of a mooney viscometer,
a is a mooney relaxation ratio,
$t_o$ is an initiation point of mooney relaxation, and
$t_f$ is a finishing point of mooney relaxation.

4) Nitrogen Atom Content (N Content)

Measurement was conducted through an NSX analysis method, and the measurement by the NSX analysis method used a quantitative analyzer of a trace amount of nitrogen (NSX-2100H).

Particularly, the quantitative analyzer of a trace amount of nitrogen (Auto sampler, Horizontal furnace, PMT & Nitrogen detector) was turned on, carrier gas flow amounts were set to 250 ml/min for Ar, 350 ml/min for $O_2$, and 300 ml/min for ozonizer, a heater was set to 800° C., and the analyzer was stood for about 3 hours for stabilization. After stabilizing the analyzer, a calibration curve of calibration curve ranges of 5 ppm, 10 ppm, 50 ppm, 100 ppm and 500 ppm was made using Nitrogen standard (AccuStandard S-22750-01-5 ml), and an area corresponding to each concentration was obtained. Then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the nitrogen atom content was calculated.

5) Modification Ratio (%)

The modification ratio (%) was calculated according to Mathematical Formula 2 below using a chromatogram obtained from the measurement of chromatography, and the measurement of the chromatography was conducted using gel permeation chromatograph (GPC) (PL GPC220, Agilent Technologies) as follows. Each copolymer was dissolved in cyclohexane and stored in a mobile phase reservoir of a specimen (prepare in 1.0 m/ml), and tetrahydrofuran (THF) was stored in another mobile phase reservoir. The mobile phase reservoirs were connected with a dual-head pump, respectively, and first, the solution in the mobile phase reservoir in which the copolymer was dissolved was injected into a column filled with a silica absorbent through the pump and an injector with a loop volume of 100 μl. In this case, the pressure of the pump was 450 psi, and an injection flow rate was 0.7 ml/min. Then, after confirming that an unmodified butadiene copolymer unit in the copolymer was not detected from a detector (ELSD, Waters Co.) any more, based on 5 minutes from the initiation of the injection, the tetrahydrofuran was injected into the column through the pump. In this case, the pressure of the pump was 380 psi, and an injection flow rate was 0.7 ml/min. After confirming that a modified copolymer unit was not detected any more in the polymer according to the injection of tetrahydrofuran from the detector, the injection of a second solvent was finished. Then, from the detected chromatogram results, a modification ratio (%) was calculated according to Mathematical Formula 2 below.

$$\text{modification ratio (\%)} = \frac{\text{peak area of modified copolymer unit}}{\text{peak area of unmodified copolymer unit} + \text{peak area of modified copolymer unit}} \times 100$$ [Mathematical Formula 2]

In Mathematical Formula 2, the peak area of the unmodified polymer unit is the peak area of the chromatogram on a first solution transported to the detector, and the peak area of the modified polymer unit is the peak area of the chromatogram on a second solution transported to the detector.

TABLE 1

| | Microstructure (wt %) | | GPC | | | | | Modification | N |
|---|---|---|---|---|---|---|---|---|---|
| Division | SM | 1,2-vinyl | Molecular weight distribution curve | Mw (×10³ g/mol) | MWD | −S/R | MLRA (MU-s) | ratio (%) | content (ppm) |
| Example 1 | 19.9 | 50.2 | Unimodal | 511 | 2.42 | 1.15 | 651 | 98 | 240 |
| Example 2 | 20.5 | 50.2 | Unimodal | 478 | 2.38 | 1.21 | 672 | 98 | 264 |
| Example 3 | 20.4 | 50.1 | Unimodal | 507 | 2.28 | 1.14 | 641 | 99 | 258 |
| Example 4 | 20.5 | 49.8 | Unimodal | 473 | 2.31 | 1.18 | 701 | 97 | 246 |
| Example 5 | 20.1 | 49.9 | Unimodal | 572 | 2.33 | 1.09 | 682 | 97 | 255 |
| Example 6 | 20.1 | 50.0 | Unimodal | 559 | 2.12 | 1.16 | 699 | 98 | 295 |
| Example 7 | 20.5 | 50.2 | Unimodal | 487 | 2.30 | 1.12 | 685 | 98 | 285 |
| Comparative Example 1 | 20.4 | 49.5 | Unimodal | 464 | 1.60 | 0.87 | 820 | 95 | 156 |
| Comparative Example 2 | 20.2 | 50.5 | Unimodal | 527 | 1.70 | 0.79 | 840 | 85 | 86 |
| Comparative Example 3 | 20.8 | 50.1 | Unimodal | 570 | 1.90 | 0.80 | 950 | 85 | 91 |
| Comparative Example 4 | 20.5 | 50.2 | Unimodal | 490 | 2.40 | 0.85 | 680 | 98 | 75 |
| Comparative Example 5 | 20.4 | 49.8 | Unimodal | 466 | 2.34 | 1.20 | 695 | 65 | 204 |
| Comparative Example 6 | 20.8 | 49.9 | Unimodal | 980 | 1.90 | 0.40 | 1900 | 98 | 240 |

As shown in Table 1, Examples 1 to 7 satisfied all conditions (i) to (vii) suggested in the present disclosure at the same time.

However, Comparative Examples 1 to 6 showed the molecular weight distribution of 2.0 or less, the nitrogen atom content of 100 ppm or less, or the mooney stress relaxation ratio of less than 0.7, and did not satisfied conditions (i) to (vii) suggested in the present disclosure at the same time.

Here, when compared with Example 1, Comparative Example 1 was prepared by a preparation method by which the step of injecting a polymerization initiator in installments was not performed, and Comparative Example 3 was prepared by a preparation method by which a polymerization initiator was injected at a point where a polymerization conversion ratio was 43% which was less than 50%, and broad molecular weight distribution properties were not shown. Particularly, though Comparative Example 1 used the same polymerization initiator and modifier as those of Example 1, the nitrogen atom content in a polymer was markedly reduced to a degree of 65%, and in case of Comparative Example 3, the modification ratio was markedly reduced to a degree of 87%.

In addition, in case of Comparative Example 6, the same polymerization initiator as that of Example 5 was used, and a nitrogen atom-containing modifier was used, and the nitrogen atom content in the polymer was high to the degree of the Examples, but the molecular weight distribution was narrow and less than 2.0, and the mooney stress relaxation ratio was less than 0.7, showing high branching. In this case, Comparative Example 6 was prepared by a preparation method by which a polymerization initiator was not injected in installments.

Through the results above, it could be confirmed that the modified conjugated diene-based polymer satisfying conditions (i) to (vii) according to the present invention at the same time could be obtained by controlling the conditions at the same time through preparing by a preparation method including controlling a polymerization conversion ratio in a first polymerization reactor to a specific point suggested in the present invention and including a polymerization step of injecting a polymerization initiator in installments at specific points.

Experimental Example 2

In order to compare and analyze the physical properties of rubber compositions including the modified conjugated diene-based copolymers prepared in the Examples and Comparative Examples, and molded products manufactured therefrom, tensile properties, viscoelasticity properties and processability properties were measured, respectively, and the results are shown in Table 3 below.

1) Preparation of Rubber Specimen

Compounding was performed using each of the modified conjugated diene-based polymers of the Examples and Comparative Examples as a raw material rubber under the compounding conditions shown in Table 3 below. The raw materials in Table 3 are represented by parts by weight based on 100 parts by weight of the raw material rubber.

TABLE 2

| Division | Raw material | Amount (parts by weight) |
|---|---|---|
| First stage mulling | Rubber | 100 |
| | Silica | 70 |
| | Coupling agent (X50S) | 11.2 |
| | Process oil | 37.5 |
| | Zinc white | 3 |
| | Stearic acid | 2 |
| | Antioxidant | 2 |
| | Antiaging agent | 2 |
| | wax | 1 |
| Second stage mulling | Sulfur | 1.5 |
| | Rubber accelerator | 1.75 |
| | Vulcanization accelerator | 2 |

Particularly, the rubber specimen was mulled via a first stage mulling and a second stage mulling. In the first stage mulling, a raw material rubber, silica (filler), an organic silane coupling agent (X50S, Evonik), a process oil (TDAE oil), zinc oxide (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystaline Wax) were mulled using a banbury mixer equipped with a temperature controlling apparatus. In this case, the initial temperature of a mulling apparatus was controlled to 70° C., and after finishing compounding, a first compound mixture was obtained at a discharge temperature of 145° C. to 155° C. In the second stage mulling, the first compound mixture was cooled to room temperature, and the first compound mixture, sulfur, a rubber accelerator (DPD (diphenylguanine)), and a vulcanization accelerator (CZ (N-cyclohexyl-2-benzothiazylsulfenamide)) were added to the mulling apparatus and mixed at a temperature of 100° C. or less to obtain a second compound mixture. Then, via a curing process at 160° C. for 20 minutes, a rubber specimen was formed.

2) Tensile Properties

The tensile properties were measured by manufacturing each specimen and measuring tensile strength when broken and tensile stress when stretched by 300% (300% modulus) of each specimen according to an ASTM 412 tensile test method. Particularly, the tensile properties were measured using a Universal Test Machin 4204 tensile tester (Instron Co.) in a rate of 50 cm/min at room temperature.

3) Viscoelasticity Properties

The viscoelasticity properties were secured by measuring viscoelasticity behavior on thermodynamic deformation at each measurement temperature (−60° C.-60° C.) with a frequency of 10 Hz by using a dynamic mechanical analyzer (GABO Co.) in a film tension mode and securing a tan δ value. In this case, if the tan δ value at a low temperature of 0° C. increases, wet skid resistance becomes better, and if the tan value at a high temperature of 60° C. decreases, hysteresis loss decreases, and rolling resistance (fuel consumption ratio) becomes better. The resultant values in Table 3 were indexed based on the resultant values of Comparative Example 1, and thus, the higher value means better results.

4) Processability Properties

By measuring the mooney viscosity (MV, ML 1+4, @100° C. MU) of the second compound mixture obtained during 1) preparation of rubber specimen, the processability properties of each polymer were compared and analyzed, and in this case, the lower the measured value of the mooney viscosity is, the better the processability properties are.

Particularly, by using MV-2000 (Alpha Technologies Co.) using Large Rotor at a rotor speed of 2±0.02 rpm at 100° C., each second compound mixture was stood at room temperature (23±5° C.) for 30 minutes or more, and 27±3 g was collected and put in a die cavity, and then, Platen was operated for 4 minutes for measurement.

TABLE 3

| Division | Tensile properties (Index, %) | | Viscoelasticity properties (Index, %) | | Processability properties (Index, %) |
| --- | --- | --- | --- | --- | --- |
| | Tensile strength | 300% modulus | tan δ at 0° C. | tan δ at 60° C. | |
| Example 1 | 103 | 115 | 99 | 134 | 110 |
| Example 2 | 101 | 115 | 100 | 136 | 120 |
| Example 3 | 99 | 112 | 100 | 130 | 109 |
| Example 4 | 102 | 111 | 101 | 129 | 111 |
| Example 5 | 100 | 114 | 102 | 132 | 113 |
| Example 6 | 100 | 110 | 99 | 125 | 107 |
| Example 7 | 101 | 110 | 99 | 130 | 110 |
| Comparative Example 1 | 100 | 110 | 101 | 125 | 66 |
| Comparative Example 2 | 100 | 100 | 100 | 100 | 100 |
| Comparative Example 3 | 100 | 99 | 98 | 95 | 110 |
| Comparative Example 4 | 100 | 101 | 98 | 102 | 101 |
| Comparative Example 5 | 100 | 105 | 97 | 102 | 110 |
| Comparative Example 6 | 100 | 105 | 95 | 125 | 65 |

In Table 3, the tensile properties and tan δ value at 0° C. of Examples 1 to 7, Comparative Example 1, and Comparative Example 3 to 6 were calculated based on the measurement values of Comparative Example 2 by Mathematical Formula 4 below, and tan δ value at 60° C. was calculated based on the measurement value of Comparative Example 2 by Mathematical Formula 5 below.

$$\text{Index (\%)} = (\text{measured value}/\text{reference value}) \times 100 \quad \text{[Mathematical Formula 4]}$$

$$\text{Index (\%)} = (\text{reference value}/\text{measured value}) \times 100 \quad \text{[Mathematical Formula 5]}$$

As shown in Table 3, Examples 1 to 7 according to embodiments of the present invention showed markedly excellent tensile properties, wet skid resistance, rolling resistance and processability in balance when compared with Comparative Examples 1 to 6.

In this case, Examples 1 to 7 satisfied all conditions (i) to (vii) suggested in the present invention, and Comparative Examples 1 to 6 did not satisfied any one or more among the conditions.

The results of Table 1 and Table 3 mean that the modified conjugated diene-based polymer of the present invention is prepared by a preparation method suggested in the present invention and could satisfy specific conditions defined by (i) to (vii) at the same time, and accordingly, improving effects of tensile properties, wet skid resistance, rolling resistance and processability in balance may be achieved.

The invention claimed is:

1. A modified conjugated diene-based polymer comprising: a repeating unit derived from a conjugated diene-based monomer; and a functional group derived from a modifier, and
satisfying the following conditions of (i) to (vii):
(i) a molecular weight distribution curve by gel permeation chromatography is unimodal;
(ii) a molecular weight distribution is 2.0 or more;
(iii) a weight average molecular weight is from 100,000 g/mol to 2,000,000 g/mol;
(vi) a modification ratio is 70% or more;
(v) a mooney stress relaxation ratio measured at 100° C. is from 0.7 to 3.0;
(vi) a mooney large relaxation area (MLRA) measured at 100° C. and represented by the following Mathematical Formula 1 is 1500 MU-s or less; and (vii) a nitrogen atom content is 100 ppm or more based on a weight of the polymer:

$$A = \frac{k}{(a+1)}\left[t_f^{(a+1)} - t_o^{(a+1)}\right]$$

[Mathematical Formula 1]

in Mathematical Formula 1,
A is the mooney large relaxation area (MLRA),
k is a mooney intercept after 1 second from stopping operation of a rotor of a mooney viscometer,
a is slope value of mooney viscosity change shown while releasing torque by stopping a rotor after measuring a mooney viscosity,
$t_o$ is an initiation point of mooney relaxation, and
$t_r$ is a finishing point of the mooney relaxation.

2. The modified conjugated diene-based polymer of claim 1, further comprising a repeating unit derived from a compound represented by the following Formula 1:

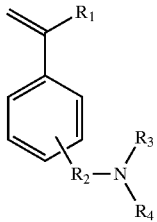

[Formula 1]

in the Formula 1,
$R_1$ is a hydrogen atom, or an alkyl group of 1 to 20 carbon atoms,
$R_2$ is a single bond or a substituted with a substituent or unsubstituted alkylene group of 1 to 20 carbon atoms,
$R_3$ and $R_4$ are each independently a substituted with a substituent or unsubstituted alkyl group of 1 to 20 carbon atoms, a cycloalkyl group of 3 to 20 carbon atoms or an aryl group of 6 to 30 carbon atoms, and
the substituent is one or more selected from the group consisting of an alkyl group of 1 to 20 carbon atoms, a cycloalkyl group of 3 to 20 carbon atoms, and an aryl group of 6 to 20 carbon atoms.

3. The modified conjugated diene-based polymer of claim 2,
wherein, in the Formula 1,
$R_1$ is a hydrogen atom, or an alkyl group of 1 to 10 carbon atoms,
$R_2$ is a single bond or an unsubstituted alkylene group of 1 to 10 carbon atoms,
$R_3$ and $R_4$ are each independently an unsubstituted alkyl group of 1 to 10 carbon atoms, a cycloalkyl group of 3 to 10 carbon atoms or an aryl group of 6 to 12 carbon atoms.

4. The modified conjugated diene-based polymer of claim 1, wherein the modifier is an alkoxysilane-based compound.

5. The modified conjugated diene-based polymer of claim 1, further comprising:
a repeating unit derived from an aromatic vinyl-based monomer,
wherein the aromatic vinyl-based monomer is one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, 1-vinyl-5-hexylnaphthalene, 3-(2-pyrrolidino ethyl) styrene, 4-(2-pyrrolidino ethyl) styrene, and 3-(2-pyrrolidino-1-methyl ethyl)-α-methylstyrene.

6. A rubber composition comprising the modified conjugated diene-based polymer described in claim 1, and a filler.

7. The rubber composition of claim 6, wherein the rubber composition comprises from 0.1 parts by weight to 200 parts by weight of the filler based on 100 parts by weight of the modified conjugated diene-based polymer.

8. The rubber composition of claim 6, further comprising a vulcanizing agent.

* * * * *